(12) United States Patent
Oestergaard et al.

(10) Patent No.: US 11,951,056 B2
(45) Date of Patent: Apr. 9, 2024

(54) PATIENT LIFTING AND REHABILITATION DEVICE

(71) Applicant: PTR Robots ApS, Odense (DK)

(72) Inventors: John E. Oestergaard, Odense (DK);
Efraim Vitzrabin, Odense (DK);
Rogério Toniato Lugon Valladão,
Odense (DK)

(73) Assignee: PTR Robots ApS, Odense (DK)

(*) Notice: Subject to any disclaimer, the term of this patent is extended or adjusted under 35 U.S.C. 154(b) by 535 days.

(21) Appl. No.: 17/163,773

(22) Filed: Feb. 1, 2021

(65) Prior Publication Data
US 2022/0054340 A1  Feb. 24, 2022

Related U.S. Application Data

(60) Provisional application No. 63/069,448, filed on Aug. 24, 2020.

(51) Int. Cl.
*A61G 7/10* (2006.01)
*A61H 1/02* (2006.01)
(Continued)

(52) U.S. Cl.
CPC ......... *A61G 7/1048* (2013.01); *A61G 7/1019* (2013.01); *A61G 7/1065* (2013.01);
(Continued)

(58) Field of Classification Search
CPC ............ A61G 2203/14; A61G 2203/20; A61G 2203/72; A61G 7/1048; A61G 7/1019;
(Continued)

(56) References Cited

U.S. PATENT DOCUMENTS 5,653,571 A    8/1997  Lizenby
6,786,896 B1   9/2004  Madhani
(Continued)

FOREIGN PATENT DOCUMENTS

DE    9404944 U1    7/1994

OTHER PUBLICATIONS

International Search Report and Written Opinion for App. No. PCT/IB2021/057768, dated Jan. 31, 2022, 17 pages.
(Continued)

*Primary Examiner* — John D Walters
(74) *Attorney, Agent, or Firm* — Donald J. Lecher; BUTZEL LONG

(57) ABSTRACT

A lift device includes two vertical extendible tower members, each of the two vertical extendible tower members including, at a first lower distal end, an omnidirectional wheel assembly, and a vertical extension assembly configured to simultaneously raise and lower the two vertical extendible tower members in a vertical direction. The lift device further includes a horizontal extendible transverse member connected between second opposing distal upper ends of the two vertical extendible tower members. The horizontal extendible transverse member further including a horizontal extension assembly configured to extend and retract the horizontal extendible transverse member in a horizontal direction perpendicular to the vertical direction, a traveler carriage configured to move in the horizontal direction upon the horizontal extension assembly between the second opposing distal upper ends of the two vertical extendible tower members, and a payload lifting device configured to raise and lower a payload in the vertical direction with respect to the traveler carriage on the horizontal extension assembly.

16 Claims, 9 Drawing Sheets

(51) Int. Cl.
  *A61H 3/00* (2006.01)
  *A61H 3/04* (2006.01)
  *G05D 1/00* (2006.01)
  *B60B 19/00* (2006.01)
(52) U.S. Cl.
  CPC ........... *A61H 1/0262* (2013.01); *A61H 3/008* (2013.01); *G05D 1/0016* (2013.01); *G05D 1/0094* (2013.01); *G05D 1/0231* (2013.01); *A61G 2203/14* (2013.01); *A61G 2203/20* (2013.01); *A61G 2203/72* (2013.01); *B60B 19/003* (2013.01); *G05D 2201/0206* (2013.01)
(58) Field of Classification Search
  CPC .... A61G 7/1065; A61H 1/0262; A61H 3/008; G05D 1/0016; G05D 1/0094; G05D 1/0231; B60B 19/003
  See application file for complete search history.

(56) References Cited

U.S. PATENT DOCUMENTS

| | | | |
|---|---|---|---|
| 7,392,554 B1 * | 7/2008 | Su | A61G 7/1096 5/86.1 |
| 8,397,320 B2 * | 3/2013 | Capaldi | A61G 7/1046 5/85.1 |
| D767,139 S | 9/2016 | Liu | |
| D767,765 S | 9/2016 | Mengxi | |
| D822,736 S | 7/2018 | Kato | |
| D822,738 S | 7/2018 | Kato | |
| 10,478,365 B2 * | 11/2019 | Ota | A61G 7/1048 |
| D868,865 S | 12/2019 | Bogart | |
| 11,395,782 B2 * | 7/2022 | Qin | A61G 7/1048 |
| 2001/0029627 A1 | 10/2001 | Von Schroeter | |
| 2002/0002740 A1 | 1/2002 | Schroeter | |
| 2002/0038477 A1 | 4/2002 | Mowery | |
| 2003/0011228 A1 | 1/2003 | Komura | |
| 2008/0066228 A1 | 3/2008 | Kume | |
| 2011/0147103 A1 | 6/2011 | Alfayad | |
| 2012/0159706 A1 | 6/2012 | Capaldi | |
| 2014/0097306 A1 | 4/2014 | Hale | |
| 2020/0038273 A1 * | 2/2020 | Rubaek | B25J 13/085 |

OTHER PUBLICATIONS

International Search Report and Written Opinion for App. No. PCT/IB2021/057768, dated Dec. 9, 2021, 13 pages.

* cited by examiner

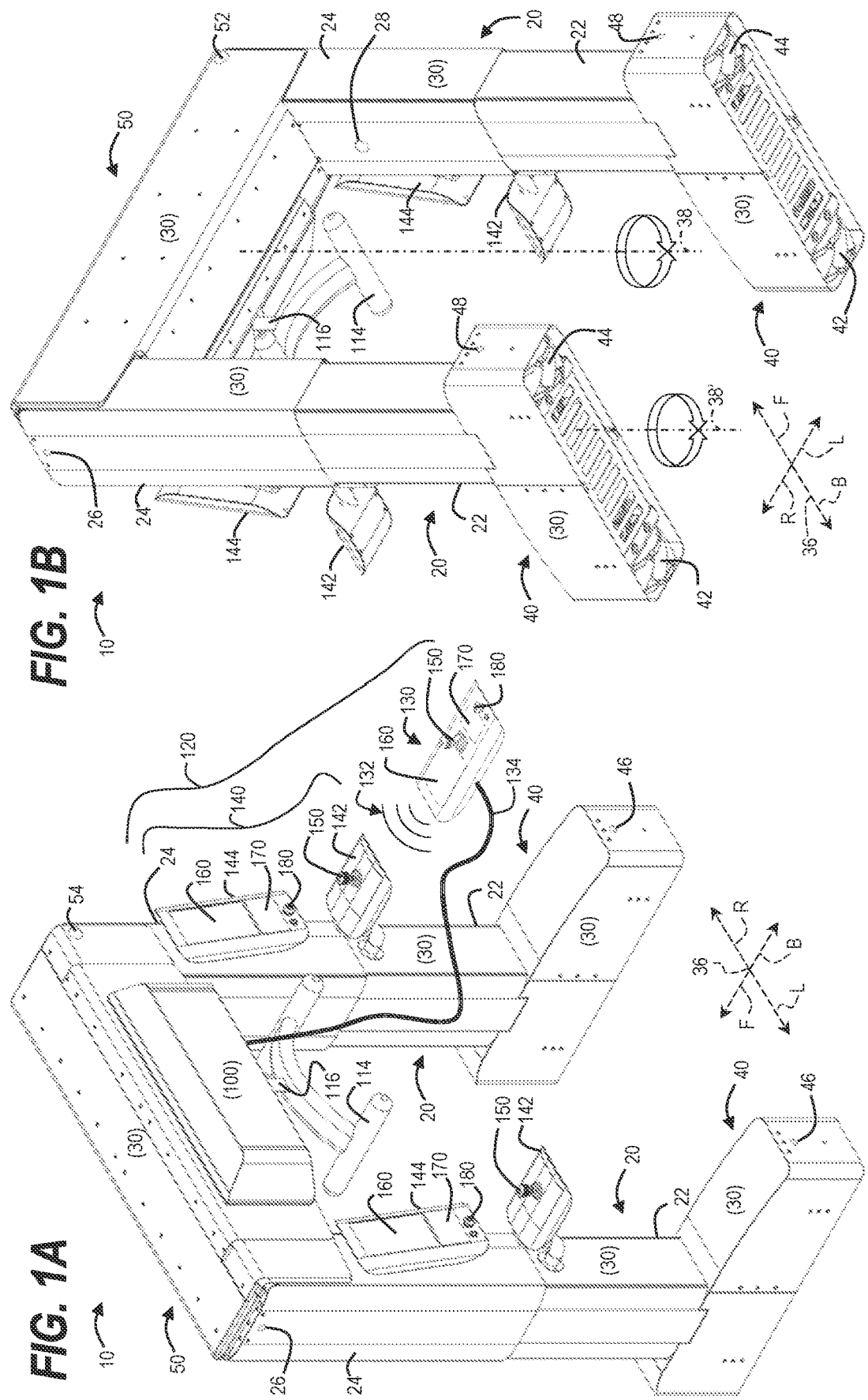

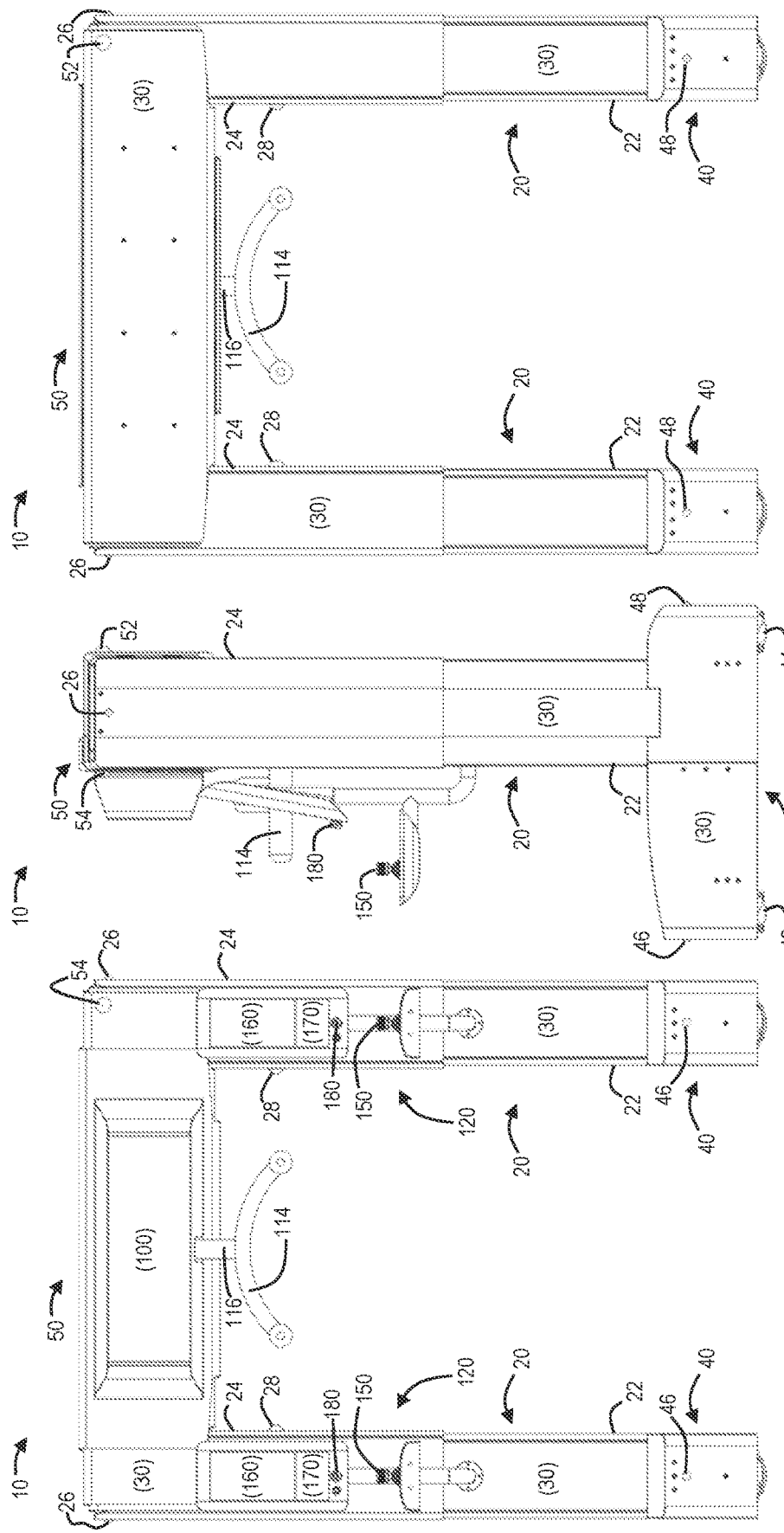

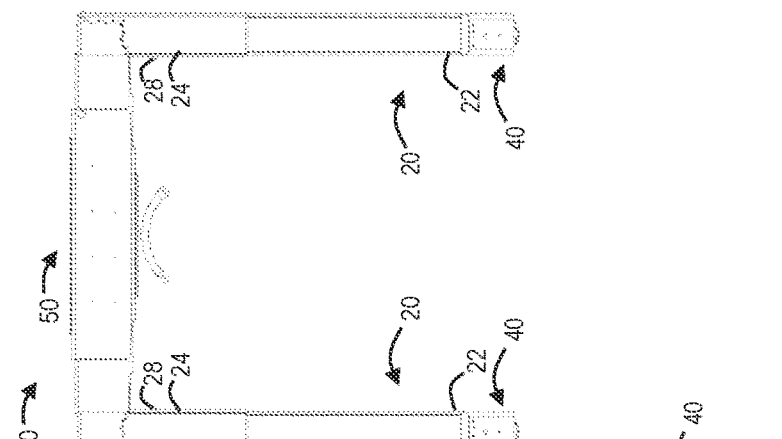
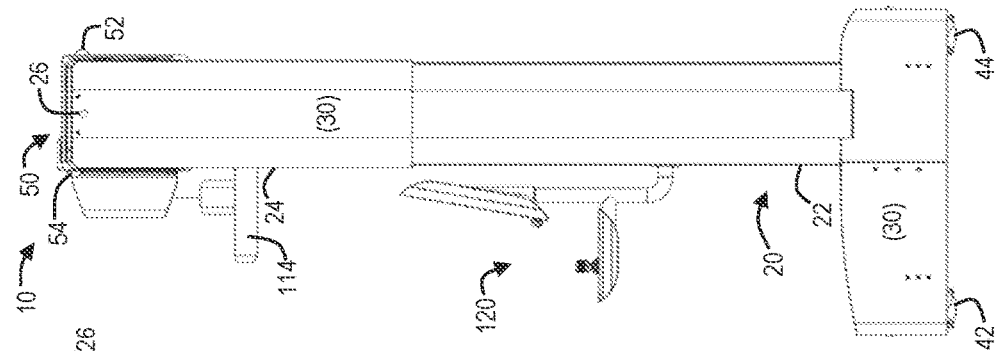
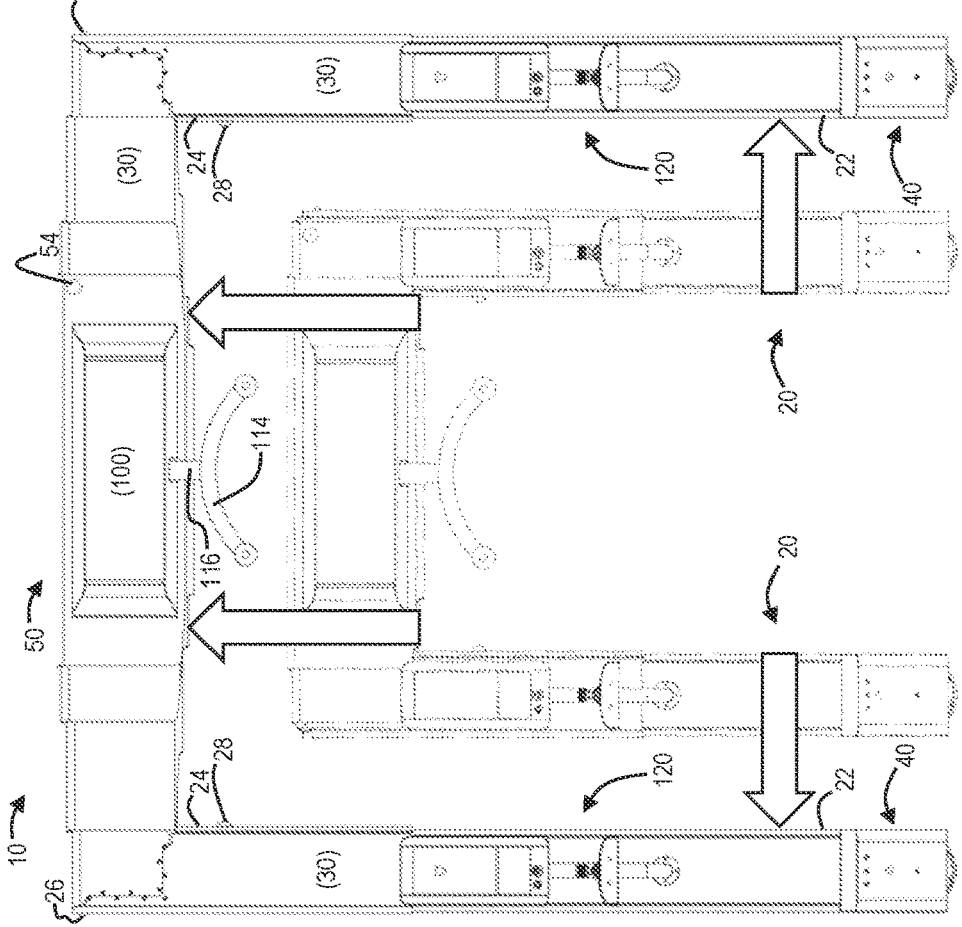

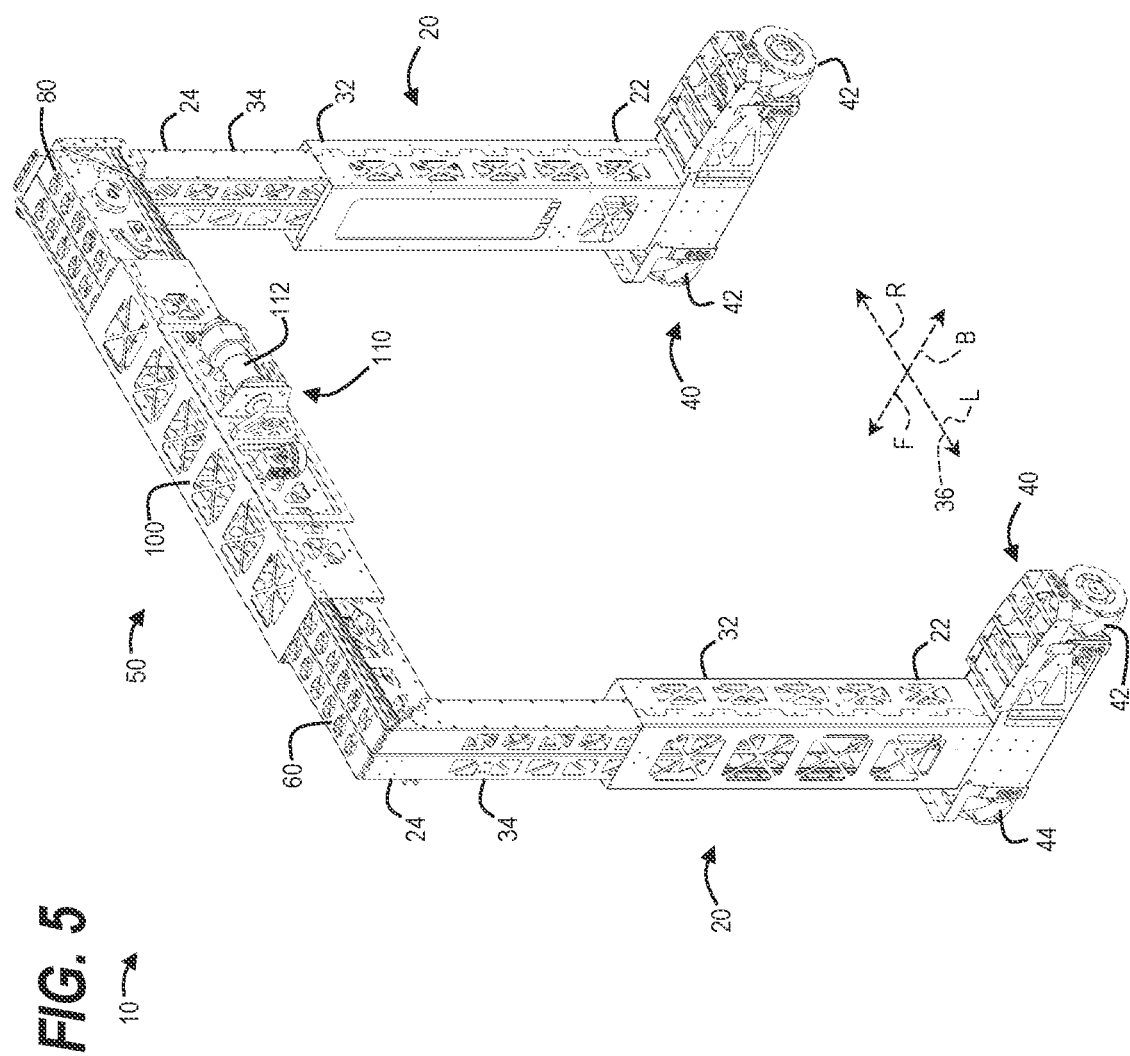

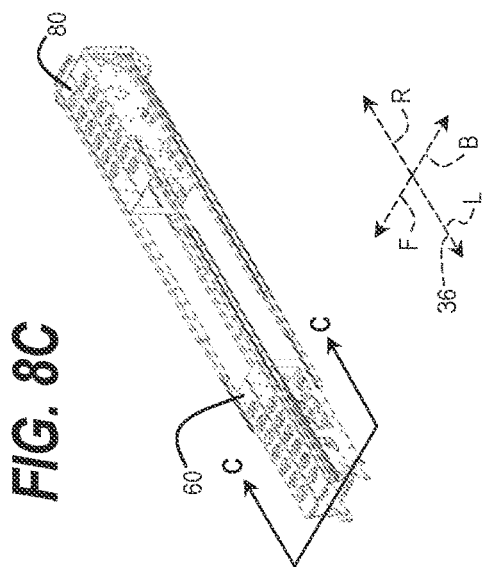
FIG. 8A
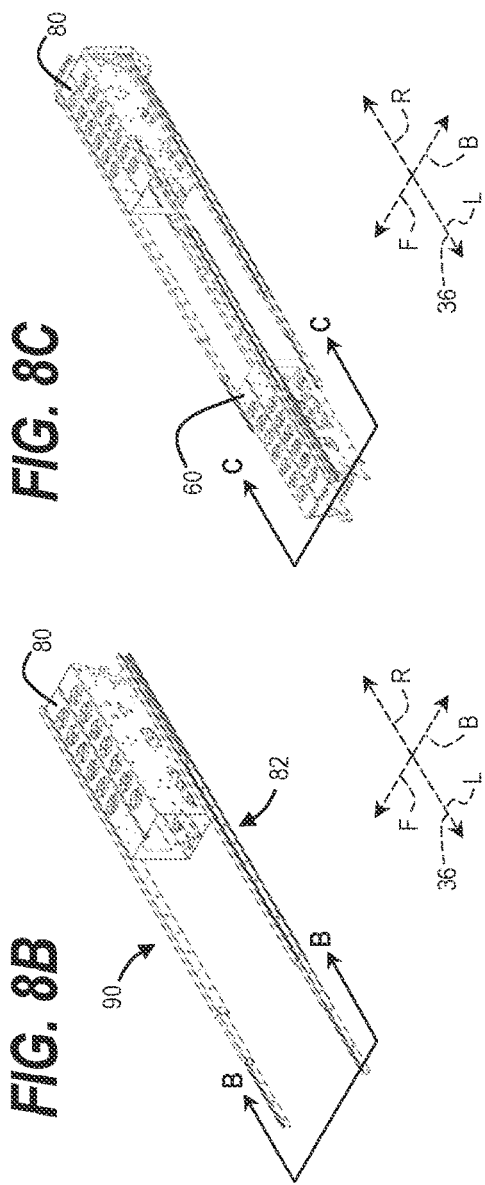
FIG. 8B
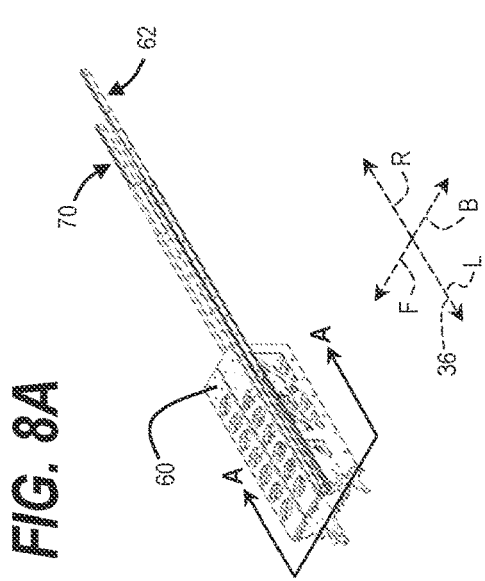
FIG. 8C
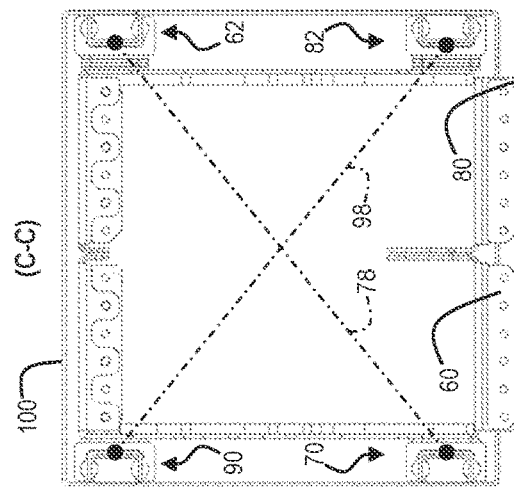
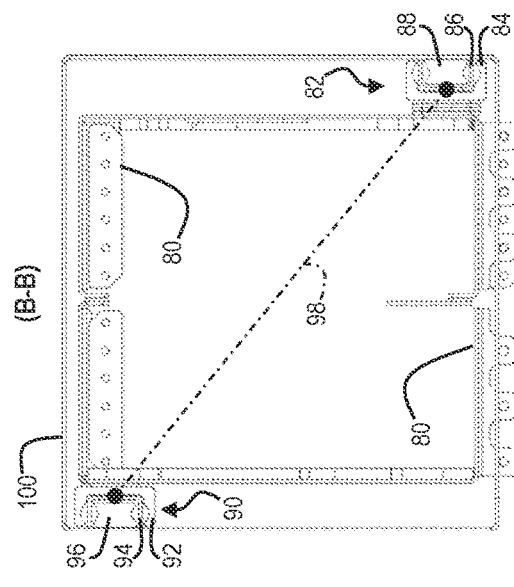
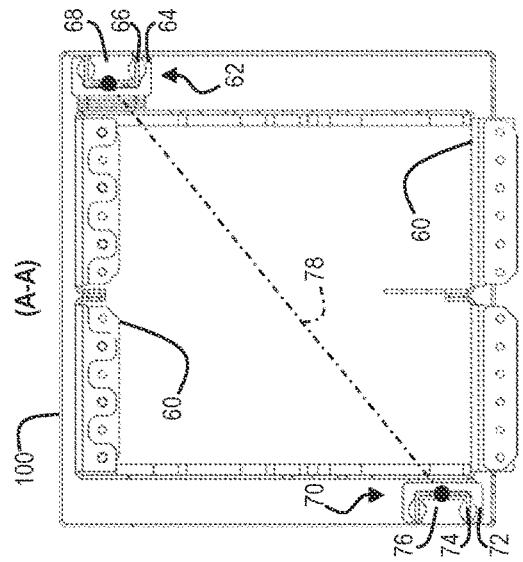

PATIENT LIFTING AND REHABILITATION DEVICE

CROSS-REFERENCE TO RELATED APPLICATIONS

This application claims the benefit of U.S. Provisional Patent Application Ser. No. 63/069,448, filed on Aug. 24, 2020.

BACKGROUND

Hospitals spend large amounts of resources on patient handling and the risk of injuries may be high for both the patient and for the professional caregivers. Today, patient lifting devices are passive, unstable and require multiple caregivers to operate. They are passive in the sense that the patient may be not an active part of the lifting and moving process, and as a result, a patient's recovery time may be prolonged from injury, trauma or repetitive stress of the passive lifting and moving process.

The existing tools for patient transfer are often characterized as rigid, and over time, not only increase the risk of injuries for the caregivers using them but also for the patients they carry. Typically, multiple tools are needed to perform both patient lifting and patient rehabilitation.

BRIEF SUMMARY

It should be appreciated that this Summary is provided to introduce a selection of concepts in a simplified form that are further described below in the Detailed Description. This Summary is not intended to be used to limit the scope of the claimed subject matter.

According to an embodiment of a lift device presented herein, a lift device may include two vertical extendible tower members, each of the two vertical extendible tower members including, at a first lower distal end, an omnidirectional wheel assembly, and a vertical extension assembly configured to simultaneously raise and lower the two vertical extendible tower members in a vertical direction, The lift device further includes a horizontal extendible transverse member connected between second opposing distal upper ends of the two vertical extendible tower members. The horizontal extendible transverse member further including a horizontal extension assembly configured to extend and retract the horizontal extendible transverse member in a horizontal direction perpendicular to the vertical direction, a traveler carriage configured to move in the horizontal direction upon the horizontal extension assembly between the second opposing distal upper ends of the two vertical extendible tower members, and a payload lifting device configured to raise and lower a payload in the vertical direction with respect to the traveler carriage on the horizontal extension assembly.

According to an embodiment of a lift device system presented herein, a lift device system may include a lift device including two vertical extendible tower members supporting a horizontal extendible transverse member, an omnidirectional wheel assembly configured to translate and rotate the lift device, and a payload lifting device configured to raise and lower a payload with respect to the horizontal extendible transverse member and translate the payload in a horizontal direction between the two vertical extendible tower members. The lift device system may further include a navigation control system configured to provide navigation control to the lift device when the omnidirectional wheel assembly may be operating, an extension control system configured to provide extension control to the two vertical extendible tower members and the horizontal extendible transverse member, and a user-interface system configured to receive input from and provide feedback to an operator.

According to an embodiment of a method of operating a lift device presented herein, the method may include providing a lift device including two vertical extendible tower members supporting a horizontal extendible transverse member, an omnidirectional wheel assembly configured to translate and rotate the lift device, and a payload lifting device configured to raise and lower a payload with respect to the horizontal extendible transverse member and translate the payload in a horizontal direction between the two vertical extendible tower members. The method may further include extending the horizontal extendible transverse member along two pairs of telescopic slides, wherein a first pair of telescopic slides are attached to a left horizontal end structure of the horizontal extendible transverse member and a traveler carriage, the first pair of telescopic slides defining a first plane being substantially diagonal to the horizontal direction, and a second pair of telescopic slides are attached to a right horizontal end structure of the horizontal extendible transverse member and the traveler carriage, the second pair of telescopic slides defining a second plane being substantially diagonal to the horizontal direction and substantially orthogonal to the first plane defined by the first pair of telescopic slides. The method may further include translating the payload lifting device on the traveler carriage within a range motion between the two vertical extendible tower members.

BRIEF DESCRIPTION OF THE SEVERAL VIEWS OF THE DRAWINGS

The embodiments will be better understood from the following detailed description with reference to the drawings, which are not necessarily drawing to scale and in which:

FIG. 1A illustrates a top perspective view of the lift device in a retracted configuration;

FIG. 1B illustrates a bottom perspective view of the lift device in the retracted configuration of FIG. 1A;

FIG. 2A illustrates a front view of the lift device in the retracted configuration of FIGS. 1A-1B;

FIG. 2B illustrates a side view of the lift device in the retracted configuration of FIGS. 1A-1B;

FIG. 2C illustrates a rear view of the lift device in the retracted configuration of FIGS. 1A-1B;

FIG. 3A illustrates a front view of the lift device of FIGS. 1A-2C in a vertically and horizontally expanded configuration;

FIG. 3B illustrates a side view of the lift device in the vertically and horizontally expanded configuration of FIG. 3A;

FIG. 3C illustrates a rear view of the lift device in the vertically and horizontally expanded configuration of FIGS. 3A-3B;

FIG. 5 illustrates a top perspective view of the lift device of FIGS. 3A-3C in the vertically and horizontally expanded configuration without tower member and transverse member exterior paneling where the translating traveler carriage may be positioned in a centered position on the horizontal extendible transverse member;

FIG. 8A illustrates a top perspective partial view of a left horizontal end structure of the horizontal extendible transverse member and a corresponding end view of a view at (A-A);

FIG. 8B illustrates a top perspective partial view of a right horizontal end structure of the horizontal extendible transverse member and a corresponding end view of a view at (B-B);

FIG. 8C illustrates a top perspective partial view of the left and right horizontal end structures of the horizontal extendible transverse member and a corresponding end view of a view at (C-C)

DETAILED DESCRIPTION

Figure 4A:
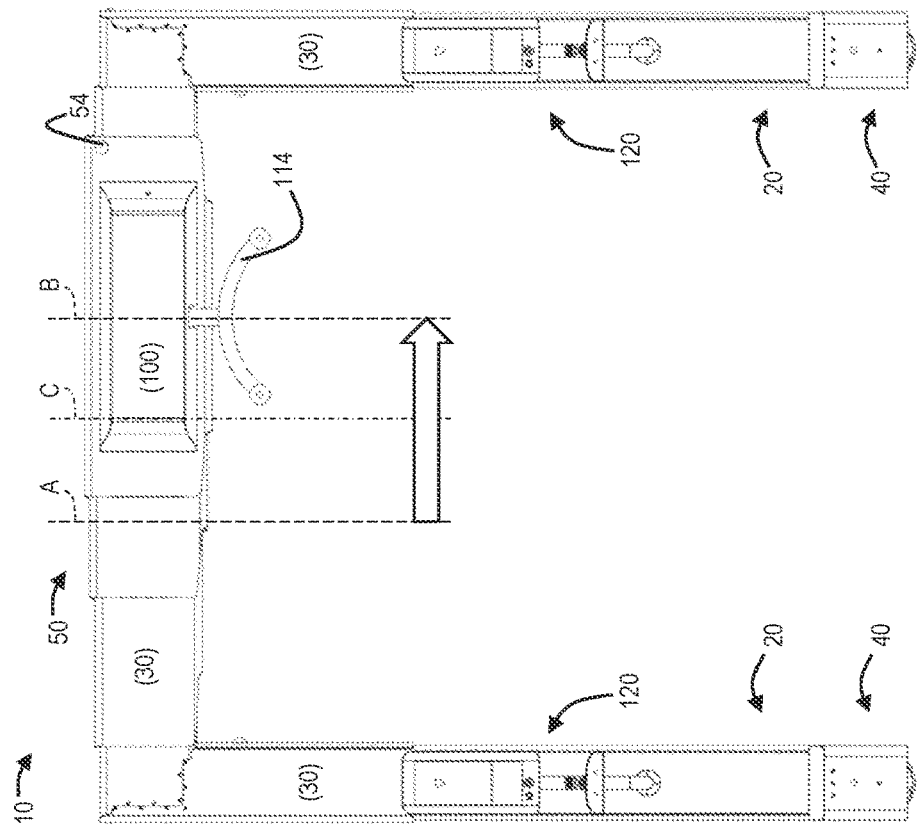
FIG. 4A illustrates a front view of the lift device of FIGS. 3A-3C in the vertically and horizontally expanded configuration where the translating traveler carriage may be moved to a left-most position on a horizontal extendible transverse member.

The patient lifting and rehabilitation device disclosed herein may be used for both patient transfer and rehabilitation, while being safe for both patients and their caregivers.

FIGS. 1A-1B and 2A-2C illustrate the lift device 10 in an example retracted configuration. FIG. 2A illustrates a front view, FIG. 2B illustrates a side view and FIG. 2C illustrates a rear view of the lift device in the retracted configuration of FIGS. 1A-1B.

FIG. 1A illustrates a top perspective view and FIG. 1B illustrates a bottom perspective view of the lift device 10 in a retracted configuration. The lift device 10 includes two opposing vertical extendible tower members 20 each having a lower distal end 22 connected to omnidirectional wheel assemblies 40. An upper distal end 24 of each of the vertical extendible tower members 20 may be connected to a horizontal extendible transverse member 50 that includes a translating traveler carriage 100 thereupon that further includes a payload lifting assembly 110.

The vertical extendible tower members 20 further include outward facing side proximity sensors 26 disposed on an outward facing portion of the upper distal end 24 configured to detect external objects, both fixed and moving, relative to the lift device 10. The vertical extendible tower members 20 on a portion of the upper distal end 24 further includes inward facing machine vision and/or proximity sensors 28 configured to detect external objects, both fixed and moving, and capture images relative to the lift device 10. The sensors 26 and 28 may be a time-of-flight camera, a radar sensor, a LiDAR sensor, time-of-flight sensor, an ultrasonic sensor, and/or an RGB camera.

The lift device 10, as illustrated in FIGS. 1A-1B, 2A-2C, 3A-3C and 4A-4B illustrate exterior paneling 30 on substantially most of the vertical extendible tower members 20, O the omnidirectional wheel assemblies 40, and the horizontal extendible transverse member 50. FIGS. 5-7 and 8A-8C illustrate components of the lift device 10 with the exterior paneling 30 removed for illustration purposes only.

The omnidirectional wheel assemblies 40 each include a front omnidirectional wheel assembly 42 and a rear omnidirectional wheel assembly 44. Each of the front and rear omnidirectional wheels assemblies 42 and 44 may include a "Mecanum" type wheel that may be an omnidirectional wheel design for land-based vehicles allowing movement in any direction. The Mecanum wheel may be a tireless wheel with a series of rubberized external rollers obliquely attached around the circumference of its rim. These external rollers typically each have an axis of rotation at 45-degrees to its wheel plane and at 45-degrees to its axle line. Each Mecanum wheel may be an independent non-steering drive wheel with its own powertrain, and when rotating generates a propelling force perpendicular to the roller axle, that can be vectored into a longitudinal and a transverse component in relation to the lift device 10. Each of the omnidirectional wheel assemblies 42 and 44 may translate the lift device 10, as represented by the directional coordinates 36, in a forward direction F, a backward/rearward direction B, a left direction L, a right direction R, or any component combination of those directions. The omnidirectional wheel assemblies 40 working together may further cause the lift device 10 to rotate about a lift device central axis of rotation 38 or may further cause the lift device 10 to rotate about either vertical extendible tower member axis 38' of either of the two vertical extendible tower members 20.

Each omnidirectional wheel assemblies 40 may further include a front proximity sensor 46 and a rear proximity sensor 48 configured to provide sensory perception of fixed and moving objects relative to the lift device 10 in both a stationary position and during a moving operation. The front 46 and rear 48 proximity sensors may include a time-of-flight camera, a radar sensor, a LiDAR sensor, time-of-flight sensor, an ultrasonic sensor, and/or an RGB camera.

The horizontal extendible transverse member 50 further includes a forward-facing machine vision and/or proximity sensor 52 and a rearward-facing machine vision and/or proximity sensor 54 configured to detect external objects, both fixed and moving, and capture images relative to the lift device 10. The machine vision and/or proximity sensors 52 and 54 may include a time-of-flight camera, a radar sensor, a LiDAR sensor, time-of-flight sensor, an ultrasonic sensor, and/or an RGB camera. The horizontal extendible transverse member to 50 may further include a translating traveler carriage 100 that includes a payload lifting assembly 110 controlled by a rotational motor 112, (see FIG. 5), connected to a payload attachment device 114 via a payload strap/cable 116.

The lift device 10 may further include at least one user-interface device 120 configured to control the lifting and transportation operating parameters of the lift device 10. The user-interface device 120 may include a portable or detachable user-interface device 130, (see FIG. 1A), that may either wirelessly communicate 132 to a transceiver, (not shown), in the lift device 10, or may provide a tethered wired connection 134 to the lift device 10, which in either configuration, may both transmit and receive operating control signals and status parameters between the lift device 10 and the portable or detachable user-interface device 130. The user-interface devices 120 may be also or in addition be removeably (as in the case of the wireless or tethered user-interface device 130) or permanently attached 140 to one or both of the two vertical extendible tower members 20, and may provide an attachment mechanism, (not shown), to allow a user to adjust the height of the attached user-interface device 130/140 relative to the vertical extendible tower members 20.

The user-interface device(s) 120, (that may include a wireless/tethered 130 and/or an attached 140 user-interface devices), may include any number of individual user-interface control elements, for example, a rotatable X-Y joystick user-interface element 150 configured to provide an operator tactile control of forward, backward, left, right and rotational motion of the lift device 10, a touchscreen or display user-interface element 160 configured to both receive user inputs and display lift device 10 status values, a multi-button keypad/touchscreen user-interface element 170 configured to receive operator inputs for repeatable inputs to the lift device 10, for example, controlling the vertical and horizontal extension of the extendible members and lifting or lowering the payload lifting assembly 110. The user-interface devices 120 may further include an emergency stop button 180 configured to receive operator input that, in a controlled manner, brings to a stop all motion of the lift device 10 to prevent injury to a patient and/or collision with an obstacle.

The removable (for example, wireless/tethered user-interface device 130) or permanently attached user-interface device 140 may be physically separated into more than one control device assembly, for example, a joystick motion control device assembly 142, (including, for example, the rotatable X-Y joystick user-interface element 150), mounted on a lower portion of the vertical extendible tower assembly 20, and an input control and status display device assembly 144, (including, for example, the touchscreen/display user-interface element 160, the multi-button keypad/touchscreen user-interface element 170, and the emergency stop button 180), mounted on an upper portion of the vertical extendible tower assembly 20. Any number of user-interface control elements may be contemplated with each user-interface control element having any number of discrete user-interface controls.

FIGS. 3A-3C, 4A-4B and 5 illustrate the lift device 10 in an example extended configuration where both the vertical extendible tower members 20 are extended to their full extension positions. FIG. 3A illustrates a front view of the retracted lift device of FIGS. 1A-2C, (shown in dotted lines for comparison), in a vertically and horizontally expanded configuration. FIG. 3B illustrates a side view and FIG. 3C illustrates a rear view of the lift device of FIGS. 3A-3B.

An operator via the touchscreen/display user-interface element 160 or the multi-button keypad/touchscreen user-interface element 170 may cause the lift device 10 to expand or retract in either or both of a horizontal and vertical direction. For example, an operator may input via a user interface a command to raise the vertical extendible tower members 20 in an upward direction or lower the vertical extendible tower members 20 and a downward direction. In another example, an operator may input via a user interface another command to extend the horizontal extendible transverse member 50 in an outward direction or retract the horizontal extendible transverse member 50 in an inward direction. Additionally, an operator may input via a user interface a combination of commands to simultaneously control the extension and retraction of both the vertical extendible tower members 20 and the horizontal extendible transverse member 50.

Figure 4B:
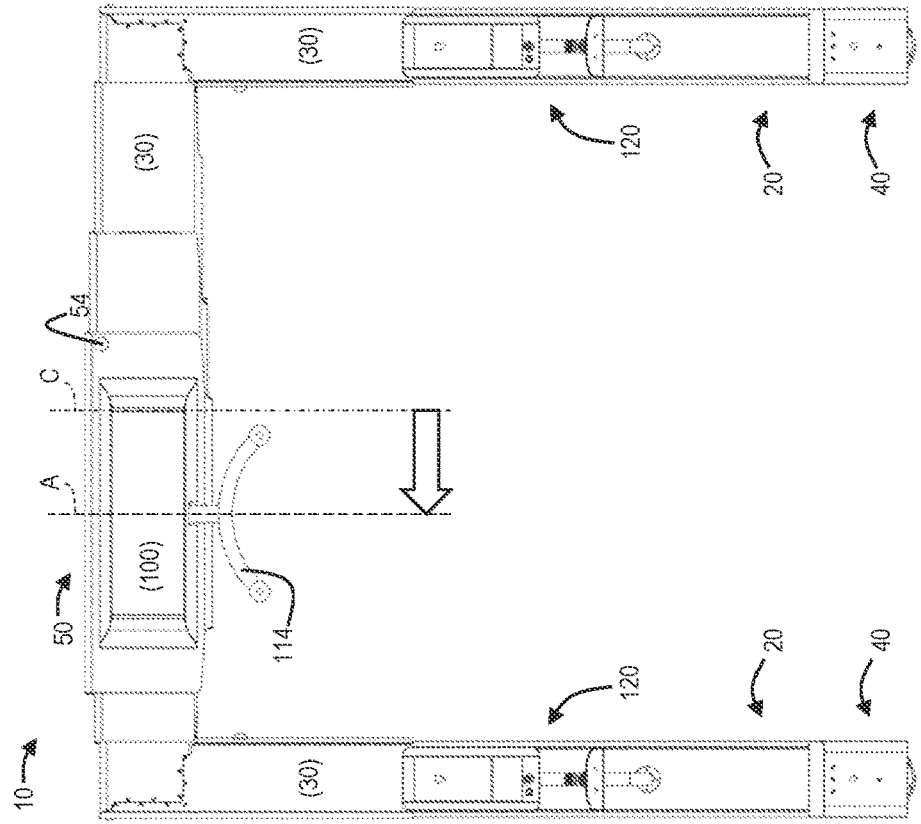
FIG. 4B illustrates a front view of the lift device of FIGS. 3A-3C in the vertically and horizontally expanded configuration where the translating traveler carriage may be moved to a right-most position on the horizontal extendible transverse member.

FIG. 4A illustrates a front view of the lift device 10 of FIGS. 3A-3C in a vertically and horizontally expanded configuration where the translating traveler carriage 100 may be moved from a center position C, (as shown in FIGS. 3A-3C), to a left-most position A on the horizontal extendible transverse member 50. FIG. 4B illustrates a front view of the lift device 10 of FIG. 4A in the vertically and horizontally expanded configuration where the translating traveler carriage 100 may be moved from the left-most position A, through the center position C, to a right-most position B on the horizontal extendible transverse member 50.

The movement of the translating traveler carriage 100 upon the horizontal extendible transverse member 50 allows an operator to move a payload between either side of the vertical extendible tower members 20. For example, a healthcare professional operator may use a user input device to control the position of the translating traveler carriage 100 when a patient may be attached to the lift device to move the patient from a hospital bed to a wheelchair or vice versa.

FIG. 5 illustrates a top perspective view of the lift device of FIGS. 3A-3C in the vertically and horizontally expanded configuration without the exterior paneling 30, (as shown in FIGS. 1A-4B), where the translating traveler carriage 100 may be positioned in a centered position on the horizontal extendible transverse member 50 between the vertical extendible tower members 20.

FIG. 5 further illustrates the vertical extendible tower members 20 including lower support frames 32 affixed to the omnidirectional wheel assemblies 40, and vertical extension frames 34 supported by the lower support frames 32 at first ends and connected to each distal end of the horizontal extendible transverse member 50 at second ends. The vertical extension frame 34 may be configured to extend and retract and a vertical direction with respect to the lower support frame 32.

FIGS. 6, 7 and 8A-8C illustrate the horizontal extendible transverse member 50 in an extension configuration where the translating traveler carriage 100 may be configured to move over the horizontal extendible transverse member 50.

Figure 6:
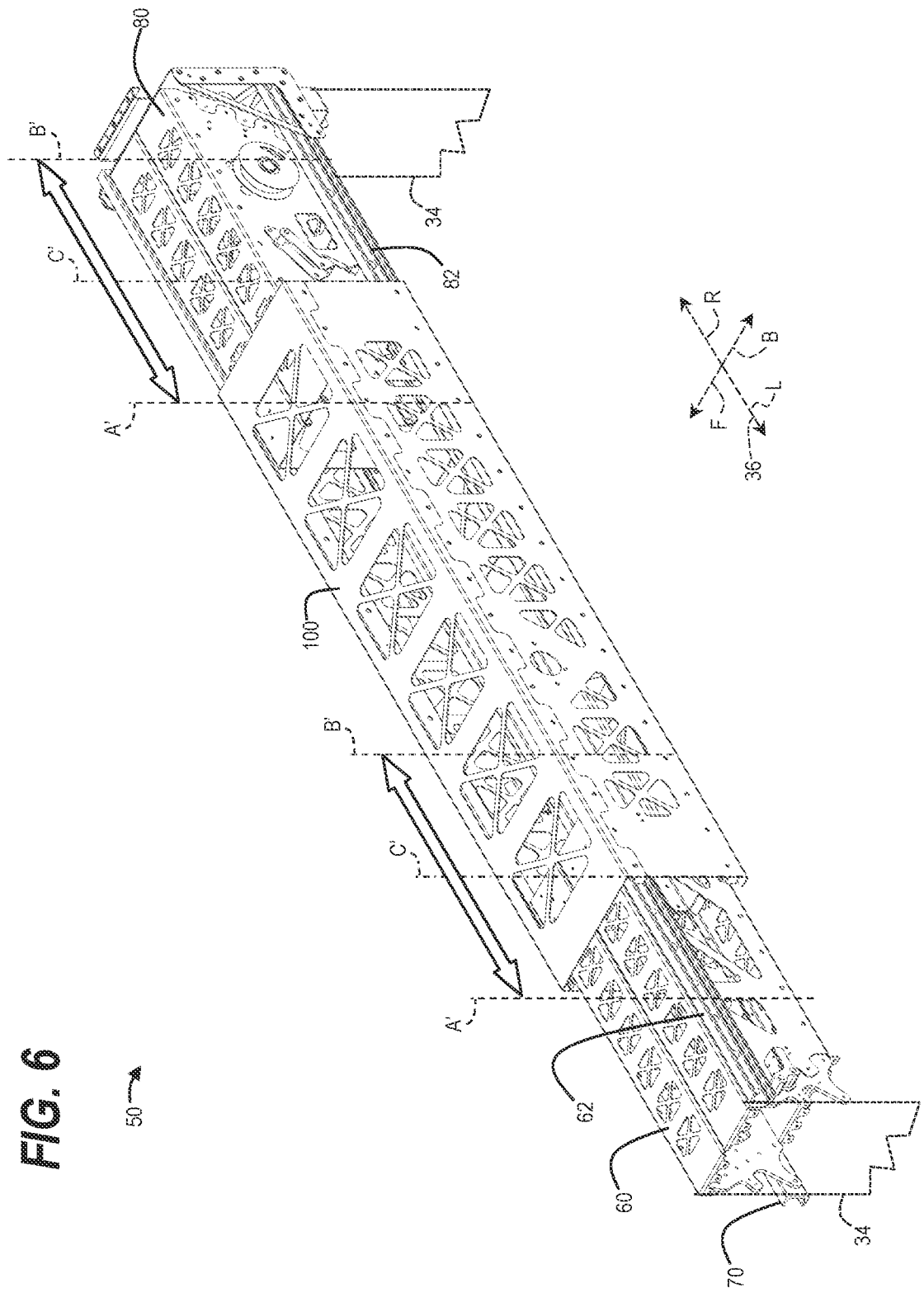
FIG. 6 illustrates a top perspective view of the horizontal extendible transverse member as shown in FIG. 5 with the translating traveler carriage positioned in the centered position on the horizontal extendible transverse member and without the vertical extendible tower members for clarity purposes.

FIG. 6 illustrates a top perspective view of the horizontal extendible transverse member 50 as shown in FIG. 5 with the translating traveler carriage 100 positioned in a centered position C' on the horizontal extendible transverse member illustrating in broken lines the vertical extension frames 34 of the vertical extendible tower members 20, (not shown), for clarity purposes.

FIG. 6 further illustrates the horizontal extendible transverse member 50 including a left horizontal end structure 60 and a right horizontal end structure 80 each connected a corresponding vertical extension frame 34 of the vertical extendible tower members 20. The translating traveler carriage 100, positioned at midpoint C' in FIG. 6, may be moved to a left-most position A' and to a right-most position B' over each respective left 60 and right 80 horizontal end structure.

Figure 7:
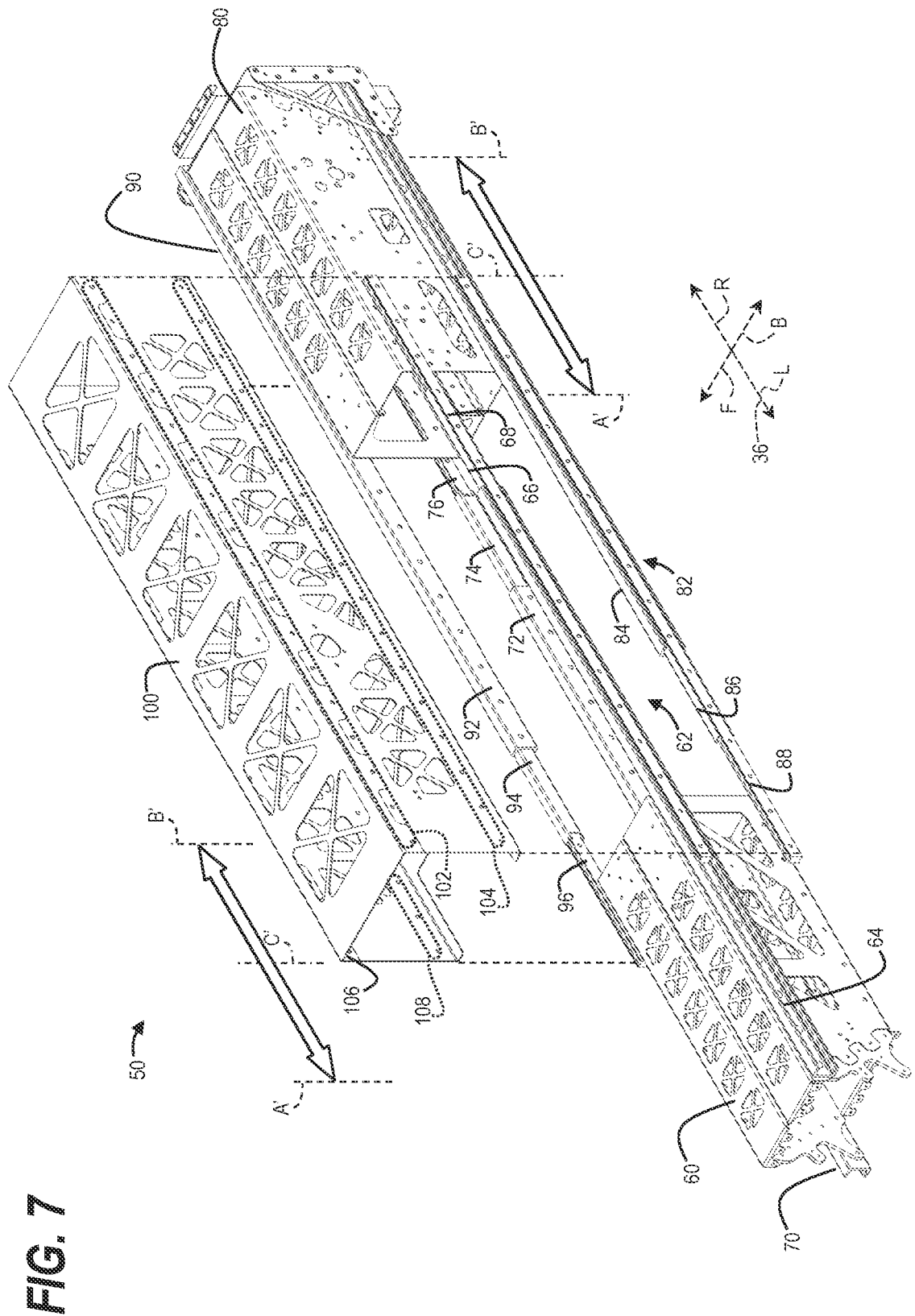
FIG. 7 illustrates a top perspective exploded view the horizontal extendible transverse member as shown in FIGS. 5-6 with the translating traveler carriage positioned in the centered position on the horizontal extendible transverse member and without the vertical extendible tower members for clarity purposes.

FIG. 7 illustrates a top perspective exploded view the horizontal extendible transverse member 50 as shown in FIGS. 5-6 with the translating traveler carriage 100 positioned in the centered position C' on the horizontal extendible transverse member 50. The left horizontal and structure 60 includes an upper rearward telescopic slide assembly 62 and a lower forward telescopic slide assembly 70.

The upper rearward telescopic slide assembly 62 includes a horizontal end structure mounting track 64, a linear ball-cage 66 and a carriage mounting track 68. The horizontal end structure mounting track 64 may be attached to an upper rearward portion of the left horizontal end structure 60, while the carriage mounting track 68 may be attached to an upper rearward telescopic slide assembly attachment portion 102 of the translating traveler carriage 100.

The lower forward telescopic slide assembly 70 includes a horizontal end structure mounting track 72, a linear ball-cage 74, and a carriage mounting track 76. The horizontal end structure mounting track 72 may be attached to a lower forward portion of the left horizontal and structure 60, of the carriage mounting track 76 may be attached to a lower forward telescopic slide assembly attachment portion 108 of the translating traveler carriage 100.

The right horizontal end structure 80 further includes a lower rearward telescopic slide assembly 82 and an upper forward telescopic slide assembly 90.

The lower rearward telescopic slide assembly 82 includes a horizontal end structure mounting track 84, a linear ball-cage 86 and a carriage mounting track 88. The horizontal end structure mounting track 84 may be attached to a lower rearward portion of the right horizontal end structure 80, while the carriage mounting track 88 may be attached to a lower rearward telescopic slide assembly attachment portion 104 of the translating traveler carriage 100.

The upper forward telescopic slide assembly 90 includes a horizontal end structure mounting track 92, a linear ball-cage 94, and a carriage mounting track 96. The horizontal end structure mounting track 92 may be attached to an upper forward portion of the right horizontal end structure 80, while the carriage mounting track 96 may be attached to an upper forward telescopic slide assembly attachment portion 106 of the translating traveler carriage 100.

FIG. 8A illustrates a top perspective partial view of the left horizontal end structure 60 of the horizontal extendible transverse member 50 and a corresponding partial assembly end view (A-A) illustrating the left horizontal end structure 60, the upper rearward telescopic slide assembly 62, the lower forward telescopic slide assembly 70 and the translating traveler carriage 100. A left horizontal end structure load bearing moment 78 defines a plane disposed between the upper rearward telescopic slide assembly 62 and the lower forward telescopic slide assembly 70, the left horizontal end structure load bearing moment 78 been substantially at a 45-degree angle to the horizontal direction.

FIG. 8B illustrates a partial assembly and top perspective partial view of the right horizontal end structure 80 of the horizontal extendible transverse member 50 and a corresponding partial assembly end view (B-B) illustrating the right horizontal end structure 80, the lower rearward telescopic slide assembly 82, the upper forward telescopic slide assembly 90 and the translating traveler carriage 100. A right horizontal end structure load bearing moment 98 defines a plane disposed between the lower rearward telescopic slide assembly 82 and the upper forward telescopic slide assembly 90, the right horizontal end structure load bearing moment 78 been substantially at a 45-degree angle to the horizontal direction.

FIG. 8C illustrates an assembly and top perspective view of the left 60 and right 80 horizontal end structures of the horizontal extendible transverse member 50 and a corresponding partial assembly end view (C-C) illustrating the assembly of both the left horizontal end structure 60, the right horizontal end structure 80, the horizontal end structure's corresponding upper 62 and lower 70 rearward telescopic slide assemblies, lower 82 and upper 90 forward telescopic slide assemblies, and the translating traveler carriage 100. The left horizontal end structure load bearing moment 78 and the right horizontal end structure load bearing moment 98 are disposed at a substantially 90-degree angle with respect to each other and intersecting substantially at the longitudinal axis of both the horizontal extendible transverse member 50 and the translating traveler carriage 100.

Figure 9:
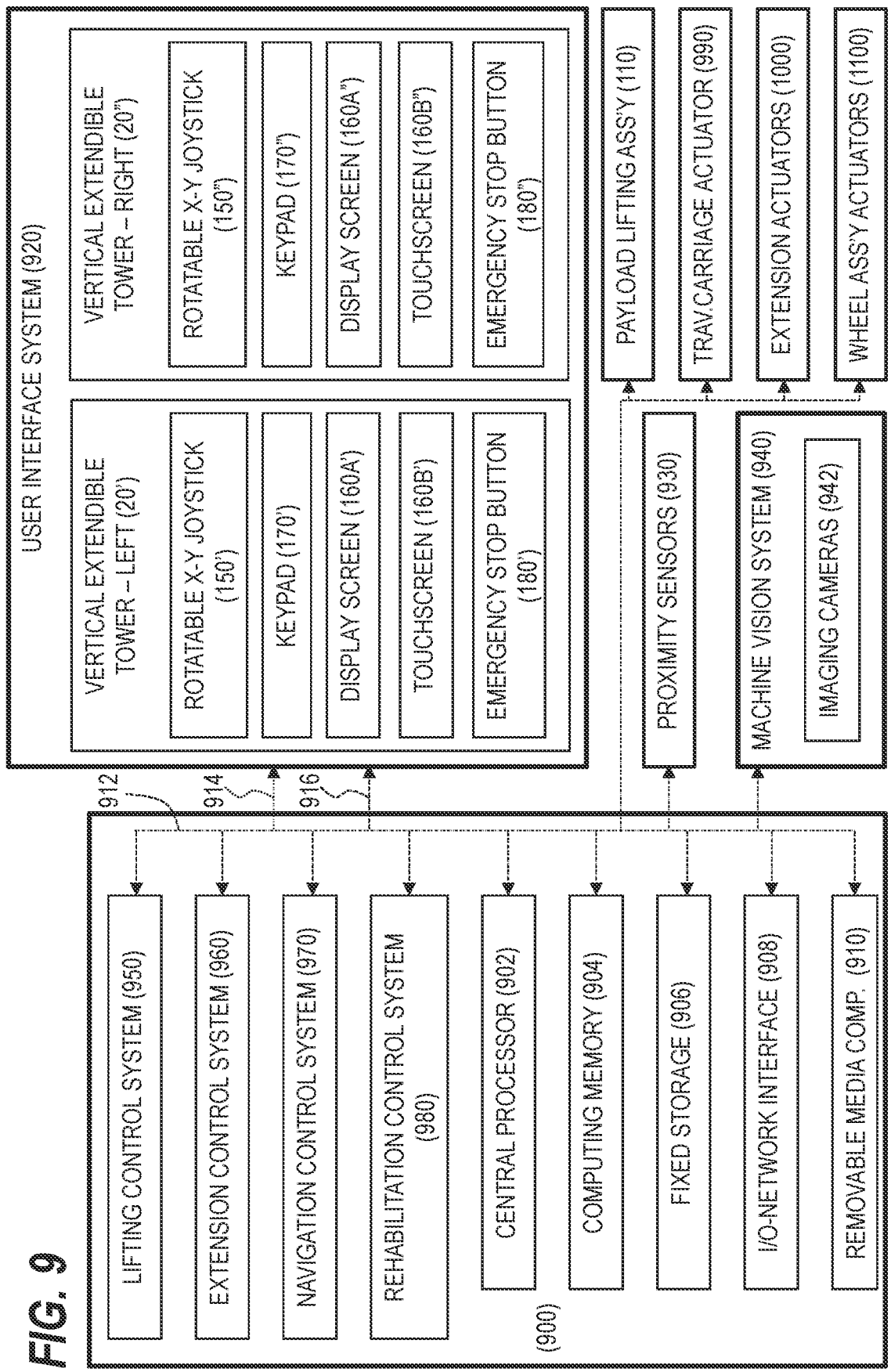
FIG. 9 illustrates a schematic diagram of a computing control system used to operate different functions of the lift device.

FIG. 9 illustrates a computing control system 900 according to an embodiment of the disclosed subject matter. FIG. 9 is an example computing control system 900 suitable for implementing embodiments of the presently disclosed subject matter. The computing control system 900 may include a system bus 912 which interconnects major components of the computing control system 900, such as a central processor 902, a computing memory 904 such as Random Access Memory (RAM), Read Only Memory (ROM), flash RAM, or the like, a fixed storage 906 such as a hard drive, flash storage, and the like, a removable media component 910 operative to control and receive an optical disk, flash drive, and the like, and a input/output (I/O) network interface 908 operable to communicate with one or more remote devices via a suitable network-connection.

The system bus 912 allows data communication between the central processor 902 and one or more memory components, which may include RAM, ROM, and other memory, as previously noted. Typically, RAM may be the main memory into which an operating system and application programs are loaded. A ROM or flash memory component can contain, among other code, the Basic Input-Output system (BIOS) which controls basic hardware operation such as the interaction with peripheral components. Applications resident with the computing control system 900 are generally stored on and accessed via a computer readable medium, such as a hard disk drive (e.g., fixed storage 906), an optical drive, floppy disk, or other storage medium.

The fixed storage 906 may be integral with the computing control system 900 or may be separate and accessed through other interfaces. The I/O-network interface 908 may provide a direct connection to a remote server via a wired or wireless connection. The I/O-network interface 908 may provide such connection using any suitable technique and protocol as will be readily understood by one of skill in the art, including digital cellular telephone, Wi-Fi, Bluetooth®, near-field, and the like. For example, the I/O-network interface 908 may allow the computer to communicate with other computers via one or more local, wide-area, or other communication networks, as described in further detail below.

The system bus 912 may provide for communication of wireless 914 or wired 916 data communications, (for example, via I/O-network interface 908), between the central processor 902 and a user-interface system 920 that may include a single or duplicate (as illustrated) user-interface control constellations on each of the vertical extendible towers, for example, on the left vertical extendible tower 20' (that may include a rotatable X-Y joystick 150', a keypad (multi-button or touchscreen device) 170', a display screen 160A', (that may include a discrete touchscreen 160B'), and an emergency stop button 180'), and on the right vertical extendible tower 20" (that may include a rotatable X-Y joystick 150", a keypad (multi-button or touchscreen device) 170", a display screen 160A", (that may include a discrete touchscreen 160B"), and an emergency stop button 180"). As described above in FIG. 1A, the lift device 10 may either exclusively or in addition include a single wired or tethered user-interface device 130 that may further include any number of the disclosed user-interface control elements, (e.g., a rotatable X-Y joystick 150, a multi-button keypad/touchscreen 170, a touchscreen/display screen 160, (that may include a discrete touchscreen), and an emergency stop button 180).

The system bus 912 allows data communication between the central processor 902 and a constellation of proximity sensors 930, (that may include proximity sensors 26, 28, 46 and 48 as illustrated in FIGS. 1A-2C), and a machine vision system 940, (that may include machine vision imaging cameras 28, 52 and 54).

The system bus 912 allows data communication between the central processor 902 and a lifting control system 950 that controls operation of the payload lifting assembly 110 and the movement of the translating traveler carriage 100. The lifting control system 950 may receive operator input from the user-interface system 920 to control operation of the payload lifting assembly 110 and side-to-side movement of the translating traveler carriage actuator 990. In addition, the lifting control system 950 may receive safety-related input signals from the proximity sensors 930 and the machine vision system 940 that may cause an interruption in operation of the lifting control system 950 and/or may warn the operator, (by auditory warning signal, a visual warning on the display screen 160A'/160A" or touchscreen 160B'/160B", or a color-coded visible warning light displayed from a portion of the lift device 10), during a lifting operation of an unsafe condition based on signals received from the proximity sensors 930 and the machine vision system 940.

The system bus 912 allows data communication between the central processor 902 and an extension control system 960 that controls extension and retraction operation of the vertical extendible tower members 20 and the horizontal extendible transverse member 50. The extension control system 960 may receive operator input from the user-interface system 920 to control extension and retraction of the vertical extendible tower members 20 and the horizontal extendible transverse member 50 via respective extension actuators 1000. In addition, the extension control system 960 may receive safety-related input signals from the proximity sensors 930 and the machine vision system 940 that may cause an interruption in operation of the extension control system 960 and/or may warn the operator, (by auditory warning signal, a visual warning on the display screen 160A'/160A" or touchscreen 160B'/160B", or a color-coded visible warning light displayed from a portion of the lift device 10), during an extension operation of an unsafe condition based on signals received from the proximity sensors 930 and the machine vision system 940.

The system bus 912 allows data communication between the central processor 902 and a navigation control system 970 that controls operation of navigation the lift device 10 via the omnidirectional wheel assemblies 40. The navigation control system 970 may receive operator input from the user-interface system 920 to control forward, backward/reverse, left, right and rotational motion of the lift device 10 and to compute navigation control signals to be sent to each respective omnidirectional wheel assembly actuator 1100. In addition, the navigation control system 970 may receive safety-related input signals from the proximity sensors 930 and the machine vision system 940 that may cause an interruption in operation of the navigation control system 970 and/or may warn the operator, (by auditory warning signal, a visual warning on the display screen 160A'/160A" or touchscreen 160B'/160B", or a color-coded visible warning light displayed from a portion of the lift device 10), during navigation of the lift device 10 of an unsafe condition based on signals received from the proximity sensors 930 and the machine vision system 940.

The system bus 912 allows data communication between the central processor 902 and a rehabilitation control system 980 that controls operation of a patient rehabilitation function. The patient rehabilitation function may be provided by the lift device 10 where a patient may be partially suspended from the payload attachment device 114 with the payload lifting assembly 110 providing an upward suspension force less than the total weight of the patient. The rehabilitation control system 980 may then monitor and record the progress of the patient during a rehabilitation routine while navigating the lift device 10 to match the speed and progress of the patient being partially suspended by the payload lifting assembly 110.

The rehabilitation control system 980 may receive operator or patient input from the user-interface system 920 to control forward, backward/reverse, left, right and rotational motion of the lift device 10 and to compute navigation control signals to be sent to each respective omnidirectional wheel assembly actuator 1100 consistent with a predetermined rehabilitation routine of the patient. The rehabilitation control system 980 may also generate navigation control signals for the navigation control system 970, extension control signals for the extension control system 960 and lifting control signals for the lifting control system 950 commensurate with a predetermined rehabilitation routine. Predetermined rehabilitation routines may be stored in the fixed storage 906 in the computing control system 900, retrieved from a remote location via the I/O-network interface 908 or input by the removable media component 910.

The rehabilitation control system 980 may receive and process images from the imaging cameras 942 of the machine vision system 940 to create a movement analysis of the patient's current rehabilitation routine and compare it with a previously stored movement analysis of the same rehabilitation routine to determine a relative progress value of the patent during the current rehabilitation routine.

In addition, the rehabilitation control system 980 may receive safety-related input signals from the proximity sensors 930 and the machine vision system 940 that may cause an interruption in operation of the rehabilitation control system 980 and/or may warn the operator, (by auditory warning signal, a visual warning on the display screen 160A'/160A" or touchscreen 160B'/160B", or a color-coded visible warning light displayed from a portion of the lift device 10), during operation of a patient rehabilitation routine of an unsafe condition based on signals received from the proximity sensors 930 and the machine vision system 940.

Many other devices or components (not shown) may be connected in a similar manner (e.g., document scanners, digital cameras and so on). Conversely, all the components shown in FIG. 9 need not be present to practice the present disclosure. The components can be interconnected in different ways from that shown. The operation of a computer such as that shown in FIG. 9 is readily known in the art and may not be discussed in detail in this application. Code to implement the present disclosure can be stored in computer-readable storage media such as one or more of the computing memory 904, fixed storage 906, removable media component 910, or on a remote storage location accessed by the I/O-network interface 908.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine-readable storage medium, such that when the computer program code may be loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code may be loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk, or any other device capable of storing electronic information. The memory may store instructions adapted to be executed by the processor to perform the techniques according to embodiments of the disclosed subject matter.

According to an embodiment of a lift device presented herein, a lift device may include two vertical extendible tower members, each of the two vertical extendible tower members including, at a first lower distal end, an omnidirectional wheel assembly, and a vertical extension assembly configured to simultaneously raise and lower the two vertical extendible tower members in a vertical direction, The lift device further includes a horizontal extendible transverse member connected between second opposing distal upper ends of the two vertical extendible tower members. The horizontal extendible transverse member further including a horizontal extension assembly configured to extend and retract the horizontal extendible transverse member in a horizontal direction perpendicular to the vertical direction, a traveler carriage configured to move in the horizontal direction upon the horizontal extension assembly between the second opposing distal upper ends of the two vertical extendible tower members, and a payload lifting device configured to raise and lower a payload in the vertical direction with respect to the traveler carriage on the horizontal extension assembly.

According to another embodiment of the lift device presented herein, the horizontal extension assembly may further include a left horizontal end structure configured to be attached to one end of the vertical extension assembly of the two vertical extendible tower members, an opposite right horizontal end structure configured to be attached to another end of the vertical extension assembly of the two vertical extendible tower members, and a telescopic slide assembly configured to connect the left and right horizontal end structures to the traveler carriage.

According to another embodiment of the lift device presented herein, the telescopic slide assembly may further include a first pair of telescopic slides attached to the left horizontal end structure and the traveler carriage, the first pair of telescopic slides defining a first plane being substantially diagonal to the horizontal direction, and a second pair of telescopic slides attached to the right horizontal end structure and the traveler carriage, the second pair of telescopic slides defining a second plane being substantially diagonal to the horizontal direction and substantially orthogonal to the first plane defined by the first pair of telescopic slides.

According to another embodiment of the lift device presented herein, the telescopic slide assembly may further include a first pair of telescopic slides attached from the left horizontal end structure to an upper portion of a first side and to a lower portion of an opposite second side of the traveler carriage, and a second pair of telescopic slides attached from the right horizontal end structure to an upper portion of the opposite second side and to a lower portion of the first side the traveler carriage.

According to another embodiment of the lift device presented herein, the telescopic slide assembly may be configured to be attached to an exterior portion of the left and right horizontal end structures and to an interior portion of the traveler carriage, and the telescopic slide assembly may be configured to allow the traveler carriage to translate in a range motion between the two vertical extendible tower members.

According to another embodiment of the lift device presented herein, the lift device may further include a machine vision system configured to assist in controlling the lift device from at least one image capture device, wherein the machine vision system may be configured to assist in navigation control of the lift device when the omnidirectional wheel assemblies are operating, and assist in extending at least one of the two vertical extendible tower members or the horizontal extendible transverse member with respect to one of the payload being lifted by the payload lifting device or a sensed potential obstruction in a motion path of the lift device.

According to another embodiment of the lift device presented herein, the lift device may further include at least one user interface configured to control navigation and extension of the extendible tower members of the lift device and lifting the payload via the payload lifting device.

According to an embodiment of a lift device system presented herein, a lift device system may include a lift device including two vertical extendible tower members supporting a horizontal extendible transverse member, an omnidirectional wheel assembly configured to translate and rotate the lift device, and a payload lifting device configured to raise and lower a payload with respect to the horizontal extendible transverse member and translate the payload in a horizontal direction between the two vertical extendible tower members. The lift device system may further include a navigation control system configured to provide navigation control to the lift device when the omnidirectional wheel assembly may be operating, an extension control system configured to provide extension control to the two vertical extendible tower members and the horizontal extendible transverse member, and a user-interface system configured to receive input from and provide feedback to an operator.

According to another embodiment of the lift device system presented herein, the navigation control system may further include a machine vision system configured to assist in controlling the lift device by providing navigation feedback to the navigation control system when the omnidirectional wheel assemblies are operating, and providing extension feedback to the extension control system when extending at least one of the vertical extendible tower members or the horizontal extendible transverse member with respect to one of the payload being one of lifted or translated by the payload lifting device, or a sensed potential obstruction in a motion path of the lift device.

According to another embodiment of the lift device system presented herein, the navigation control system may further include a proximity detection system configured to assist in controlling the lift device by, providing navigation feedback to the navigation control system when the omnidirectional wheel assemblies are operating, and providing extension feedback to the extension control system during a process of extending at least one of the two vertical extendible tower members or the horizontal extendible transverse member with respect to one of the payload being lifted by the payload lifting device or a sensed potential obstruction in a motion path of the lift device.

According to another embodiment of the lift device system presented herein, the user-interface system may have a user-interface device disposed on each of the two vertical extendible tower members and may be configured to allow an operator to control the lift device from either of the two vertical extendible tower members.

According to another embodiment of the lift device system presented herein, each user-interface device may further include a rotatable X-Y joystick input device configured to control translation and rotational motion of the lift device via the navigation control system, an extension control input device configured to control extension and retraction of the two vertical extendible tower members and the horizontal extendible member via the extension control system, and a display output device configured to display extension dimensions of the two vertical extendible tower members and the horizontal extendible member, and speed and direction values of the lift device when the omnidirectional wheel assembly may be operating.

According to another embodiment of the lift device system presented herein, the horizontal extendible transverse member may further include a horizontal extension assembly configured to extend and retract the horizontal extendible transverse member in the horizontal direction perpendicular to a vertical direction, and a traveler carriage configured to move in the horizontal direction upon the horizontal extension assembly between the two vertical extendible tower members.

According to another embodiment of the lift device system presented herein, the horizontal extension assembly may further include a first pair of telescopic slides attached to a left horizontal end structure and the traveler carriage, the first pair of telescopic slides defining a first plane being substantially diagonal to a longitudinal axis of the traveler carriage, and a second pair of telescopic slides attached to a right horizontal end structure and the traveler carriage, the second pair of telescopic slides defining a second plane being substantially diagonal to the longitudinal axis of the traveler carriage and substantially orthogonal to the first plane.

According to another embodiment of the lift device system presented herein, the horizontal extension assembly may further include a first pair of telescopic slides attached from the left horizontal end structure to an upper portion of a first side and to a lower portion of an opposite second side of the traveler carriage, and a second pair of telescopic slides attached from the right horizontal end structure to an upper portion of the opposite second side and to a lower portion of the first side the traveler carriage.

According to an embodiment of a method of operating a lift device presented herein, the method may include providing a lift device including two vertical extendible tower members supporting a horizontal extendible transverse member, an omnidirectional wheel assembly configured to translate and rotate the lift device, and a payload lifting device configured to raise and lower a payload with respect to the horizontal extendible transverse member and translate the payload in a horizontal direction between the two vertical extendible tower members. The method may further include extending the horizontal extendible transverse member along two pairs of telescopic slides, wherein a first pair of telescopic slides are attached to a left horizontal end structure of the horizontal extendible transverse member and a traveler carriage, the first pair of telescopic slides defining a first plane being substantially diagonal to the horizontal direction, and a second pair of telescopic slides are attached to a right horizontal end structure of the horizontal extendible transverse member and the traveler carriage, the second pair of telescopic slides defining a second plane being substantially diagonal to the horizontal direction and substantially orthogonal to the first plane defined by the first pair of telescopic slides. The method may further include translating the payload lifting device on the traveler carriage within a range motion between the two vertical extendible tower members.

According to another embodiment of the method of operating the lift device presented herein, the method may further include providing the first pair of telescopic slides to be attached from a left horizontal end structure to an upper portion of a first side and to a lower portion of an opposite second side of the traveler carriage, and providing the second pair of telescopic slides to be attached from a right horizontal end structure to an upper portion of the opposite second side and to a lower portion of the first side the traveler carriage.

According to another embodiment of the method of operating the lift device presented herein, the method may further include providing a machine vision system configured to assist in controlling the lift device, providing, by the machine vision system, navigation feedback to a navigation control system when the omnidirectional wheel assemblies are operating, and providing, by the machine vision system, extension feedback to an extension control system when extending at least one of the two vertical extendible tower members or the horizontal extendible transverse member with respect to one of the payload being one of lifted or translated by the payload lifting device, or a sensed potential obstruction in a motion path of the lift device.

According to another embodiment of the method of operating the lift device presented herein, the method may further include providing a proximity detection system configured to assist in controlling the lift device, providing, by the proximity detection system, navigation feedback to a navigation control system when the omnidirectional wheel assemblies are operating, and providing, by the proximity detection system, extension feedback to an extension control system during a process of extending at least one of the two vertical extendible tower members or the horizontal extendible transverse member with respect to one of the payload being lifted by the payload lifting device or a sensed potential obstruction in a motion path of the lift device According to another embodiment of the method of operating the lift device presented herein, the method may further include providing a user-interface device disposed on each of the two vertical extendible tower members configured to allow an operator to control the lift device from either of the two vertical extendible tower members, receiving, on one of the two user-interface devices, direction and rotation input from an operator configured to control translation and rotational motion of the lift device, receiving, on one of the two user-interface devices, extension control input from the operator configured to control extension and retraction of the two vertical extendible tower members and the horizontal extendible transverse member, and displaying, on both the user-interface devices, extension dimensions of the two vertical extendible tower members and extension dimensions of the horizontal extendible transverse member, and a speed value of the lift device.

The patient lifting and rehabilitation device as disclosed herein may generally comprised of three components—a pair of extendable vertical towers each connected at a top distil end to an expandable transverse member having a patient lifting traveler that may be configured to move between each of the vertical towers.

Each of the left and right with vertical towers includes an omnidirectional wheel assembly at a lower distal thereof. Each omnidirectional wheel assembly includes a front and rear wheel assembly capable of translating the patient lifting and rehabilitation device across any surface the device may be supported on and rotating the patient lifting and rehabilitation device with respect to its geometric center. These features provide the caregiver the ability to drive the patient lifting and rehabilitation device in any direction with ease and rotate about its own axis because of the omnidirectional wheels. A motion controller for the patient lifting rehabilitation device may provide smooth acceleration, that may be a slower rate of increase or decrease, or even a mathematical function variation relevant for e.g. smooth operations as well as for specific rehabilitations, in the speed of motion during transportation, patient lifting and device retraction and expansion, in both a low speed mode and a high speed mode.

A ground lighting system disposed near each of the front and rear wheel assemblies, may provide indicator lighting that may communicate to an operator an operational condition function or a warning status. For example, the ground lighting system may provide a particular colored lighting, a steady lighting or a flashing lighting to indicate that the patient lifting and rehabilitation device may be in a non-patient transport mode, a patient transport mode, a patient rehabilitation mode, or may indicate a warning or error status during or before each of these modes.

Each of the left and right vertical towers may be simultaneously extended in a vertical direction from a retracted position to an extended position to increase or reduce the operational height of the patient lifting and rehabilitation device during any of the modes of operation.

A transverse member may be connected to each top vertical and of the pair of vertical towers and may be extendible between the pair of vertical towers from a retracted position to an extended position. The extendible motion of the transverse member may also be controlled to have a smooth acceleration in both a selectable slow and fast speed.

A patient lifting traveler may be connected to the transverse member and configured to translate between at each of the pair of vertical towers. The translation motion of the traveler member may also be controlled to have a smooth acceleration in both a selectable slow and fast speed.

The patient lifting traveler also contains a lifting motor for spooling to lift and un-spooling to lower a flexible lifting member connected to a yolk configured to hold a harness that supports a patient. The lowering and raising of the flexible patient lifting member may also be controlled to have a smooth acceleration in both a selectable slow and fast speed.

The patient lifting and rehabilitation device may include user-interface devices that may control respective movement and operation modes. For the purposes of this disclosure, the user-interface devices will be discussed from the perspective of which type of user may be interacting with the interface device.

The caregiver user-interface devices are designed for single-handed operation to allow the caregiver to maintain control of the patient with the other hand while being lifted or transported by the patient lifting and rehabilitation device. One caregiver user-interface device may be a patient lift user interface that controls both the raising and lowering of the patient, with respect to the transverse member, and the side-to-side disposition of the patient between the left and right tower structures.

Another caregiver user interface includes a pair of user interfaces each a duplicate of the other, where each user interface may be disposed on the left and right tower structure. This configuration of the pair of user-interface devices allows a caregiver to control the patient lifting and rehabilitation device from either side of the device when it may be disposed over a hospital bed where it may be difficult for caregiver to reach across the bed to only a single user-interface device. Each of the pair of user interfaces may be located at a mid-point height on a respective tower structure for ease of access by a caregiver when walking, sitting or standing near the patient lifting and rehabilitation device. Each user interface of the pair of user interfaces provides a simple one-handed controllable navigation system enabling the caregiver to maintain one hand free to support the patient.

Each user interface of the pair of user interfaces may include controls to raise and lower the patient, controls to move the patient between at the left and right towers, controls to raise the height of the left and right towers, controls to expand or contract the transverse member, and controls to translate the attached patient between the left and right towers of a traveler on the transverse member. The controls may include a touch sensitive surface or buttons to control the expansion or contraction of any member, and a rotatable joystick configured to translate the entire patient lifting and rehabilitation device in a forward, rearward, left or right direction, or a simultaneous combination of directions, and rotate the patient lifting and rehabilitation device about its own axis. The touch sensitive surface may include a display and an audio speaker configured to indicate a battery status, a vertical and horizontal size of the patient lifting and rehabilitation device, and any sensor or proximity alerts during an operational mode.

The caregiver user-interface devices are configured to easily adjust both the height and width of the patient lifting and rehabilitation device to retract its members to fit through a doorway or expand its members over a bed and a wheelchair to facilitate a patient transfer process. The sideways patient displacement of the patient lifting and rehabilitation device may be configured to translate a patient between the tower structures using the movement of the traveler on the transverse structure facilitating a patient transfer, e.g., from a wheel chair to bed more efficiently.

Additionally, the rotatable joystick may be configured to allow the caregiver to perform a one-handed driving operation offering the other hand to support the patient in transit, providing for intuitive operation with only two fingers on the joystick where no special training for the caregiver may be necessary.

An additional user interface may include an emergency stop button on both sides of the power structures configured to allow the caregiver to immediately stop the patient lifting and rehabilitation device in any of its operational modes.

The patient rehabilitation user-interface device may be a separate device or may be a user-interface device used by the caregiver that may be reconfigured or moved to be operated by the patient during a rehabilitation mode. The patient rehabilitation user device may include a video monitor for displaying particular rehabilitation instructions to the patient, an audio speaker to provide spoken instructions during a rehabilitation session, and a microphone for receiving audio feedback from or providing full duplex communication with the patient during a rehabilitation session.

The vertical towers may further include at least one video camera mounted in a position configured to capture full body images of the patient during a rehabilitation session. The patient lifting and rehabilitation device may have an onboard computer to process the captured full body images of the patient during the rehabilitation session and analyze the captured full body images with respect to linear and angular displacement of recognized parts of the body. On the basis of the analyzed full body images, the computer may provide feedback to the patient during the rehabilitation session, provide feedback to a caregiver monitoring the rehabilitation session, and/or adjust certain speed and patient load parameters of the patient lifting and rehabilitation device in real-time during the rehabilitation session of the patient.

During patient transport, the patient transport and rehabilitation device may operates in a semi-autonomous mode allowing the caregiver to manually operate the device while proximity sensors monitor environmental and weight sensors monitor patient loading data to ensure safe operation during the patient transport mode. These sensors mounted on the patient lifting and rehabilitation device may provide feedback and motion override control during a potential hazard or obstruction. A proximity sensor may be used to determine if the patient lifting and rehabilitation device may be on a path to collide with a fixed object or immovable object a person in and/or round the path of a device. A weight sensor may provide feedback when it may be determined that an unsafe loading of the patient lifting and rehabilitation device occurs, and a stop function or an alert may be provided. The weight sensor may provide feedback when it may be determined that an unbalanced loading situation as determined between the right and left towers, and a stop function or an alert may be provided. The weight sensor may provide feedback when it may be determined that the patient may be swinging when attached to the patient lifting and rehabilitation device, where a stop function, an alert indication, or a slowing of the transport or lifting operation may occur to eliminate the unstable patients swinging before any further function resumes.

Autonomous features may include rehabilitation therapy for patients where the patient lifting and rehabilitation device may be programmed for particular rehabilitation therapy sessions while supporting the patient. For example, the particular rehabilitation therapy session may include assisting a patient to walk at a certain pace in a straight line from a beginning point, turning the patient, walking at the same or a different pace in a straight line back to the beginning point, and repeating this procedure a number of prescribed times.

Additionally, autonomous features may be engaged for the transport of patients or transport of the device itself between known points or along known paths without the assistance of a caregiver. During this autonomous transportation mode, proximity, load and speed sensors will continue to operate to ensure the patient has not shifted to a dangerous loading position and to avoid any fixed or moveable obstructions in route.

The patient lifting and rehabilitation device may also have an adaptive motion controller to control the motion of all expanding and contracting points of the device and movement of the device when carrying a patient. For example, motion subject to the smooth motion control would include driving, lifting patients, resizing horizontally and vertically, and rotating the patient lifting and rehabilitation device, where these motions may occur either simultaneously or sequentially.

Smooth motion control may control motors to begin operating and slow speeds with a low acceleration speed increase depended on a patient weight and/or position taken from a weight sensor in the patient lifting and rehabilitation device. Weight sensors may be integrated within each vertical tower providing left and right sensed weights to provide a composite weight of the patient and look for a dangerous unbalanced situation has determined between sensed weights of the right and left weight sensors. A weight sensor may be integrated with the patient lift traveler of the transverse member that may directly measure the patient's weight and may be provided to caregivers as independent patient data that may otherwise be difficult to obtain from the patient. Weight sensor(s) may also be integrated within each wheel assembly of the vertical towers to provide a total weight of the patient lifting and rehabilitation device with the patient and monitored for any dangerous and unbalanced situations as described above.

Smooth motion control may also take effect when a proximity sensor determines the likely collision with a fixed or movable object during any operational mode to slow the device down enabling the caregiver to either reposition and/or reconfigure either vertically or horizontally the device to avoid the anticipated object. For example, when the patient lifting and rehabilitation device may be not carrying the patient, and a proximity sensor determines a likely obstruction, (for example, a doorway in the forward direction of the navigation path), the smooth motion control slows down the speed of the wheel assemblies and presents the operator with a warning to avoid the object by either navigating clear of the obstruction with the rotatable joystick or to reconfigure the device vertically and/or horizontally to clear the obstruction.

In a mode where an operator may be moving the patient lifting and rehabilitation device without a patient, the smooth motion control may be not needed under normal circumstances, and the device operates in a fast mode. The fast mode allows all the motors that control the vertical and horizontal expansion of the device, and the transportation and rotation of the device were paraded at a higher speed than the slow-motion mode.

Whenever the patient lifting and rehabilitation device senses by the weight sensor that a patient may be attached to the device, the device by default enters into a slow-motion mode. However, a caregiver may override the slow-motion mode during patient transport with the user-interface device and cause the device to operate in a faster mode.

However, operating the patient lifting and rehabilitation device in the fast mode with a patient may be potentially dangerous to the patient and should only be used in emergency situations where the life of the patient may be at risk. During this type of emergency situation, the user interface may present a prompt to and require interaction from the caregiver regarding the increase risk of injury to the patient while operating in the fast mode to prevent accidental operation of the device in the fast mode.

Patients in the bed may be turned, lifted and transferred to a wheelchair, a walking apparatus or another horizontal patient support device, e.g., another bed, a stretcher or a gurney. Patients may be transferred directly from a bed to a wheel chair in two ways: 1) by lifting the patient and moving the device over the foot of the bed and then lowering the patient into a wheelchair; or 2) expanding the device over both the bed and wheelchair, where once the patient may be lifted off the bed, the patient lift traveler translates the patient over the bed and may be then lowered into the wheelchair.

If a patient may be on a stretcher or gurney, e.g., from an ambulance or operation theater, the patient may be transferred directly to a bed with the patient lifting and rehabilitation device by expanding the device over both the bed and stretcher, where once the patient may be lifted off the stretcher, the traveler carries the patient over the stretcher and may be lowered into the bed.

For example, moving a post-surgery patient in a conventional manner can be complicated and challenging given the increased risk of injuring the post-surgery patient during a conventional lifting process where a non-ambulatory patient has a much higher risk of falling over during a patient transporting and/or a patient transferring process. The disclosed device lowers these risks to these types of patients as a result of its controlled motion while transporting and transferring post-operative patients from one supportive means to another.

The patient may be transferred in a similar manner from the stretcher/gurney to a wheelchair or walking apparatus as described above.

The caregiver can transfer a patient to the bathroom by the patient lifting and rehabilitation device when needing the toilet or bath by assisting a patient into and out of the bathroom, on and off the toilet, and/or in and out of the shower without having to change assistive devices.

If a patient falls to the floor, the caregiver may use the patient lifting and rehabilitation device to lift the patient up from the floor and into a wheelchair, bed or gurney.

As described above, the patient lifting and rehabilitation device may be programmed in an autonomous mode to assist a patient with a sit-to-stand rehabilitation therapy. With this type of therapy, the patient may be connected to the device to prevent the patient from falling during the rehabilitation session, and may be assisted by providing a lifting force less than the full body weight of the patient to assist the patient into standing from a seated position.

The patient lifting and rehabilitation device may be programmed in an autonomous and mode to assist a patient with the stand-to-walk rehabilitation therapy. With this type of therapy, the patient may be connected to the device to prevent the patient from falling during the rehabilitation session, and may be assisted by providing a lifting force less than the full body weight of the patient to assist the patient in maintaining stability while standing, and then following the patient at the patient's forward speed during a walking operation.

The patient lifting and rehabilitation device may be programmed in either an autonomous mode or a semi-autonomous mode to assist a patient with walking rehabilitation therapy. With this type of therapy, the patient will be connected to the device, to prevent the patient from falling during the rehabilitation session, and may be assisted by providing a lifting force less than the full body weight of the patient to assist the patient in maintaining stability while walking. The device follows the patient at the patient's forward speed during a walking operation, and as an option, via the device mounted camera and image processing computer, the device may analyze the gait and motion of the patient's body to compensate the device's movement with the patient's movement and provide advice to the patient via the user interface during the therapy session. And additional benefit of the gait and motion detection and analysis provided by the disclosed device may be that patient gait and motion data may be analyzed and compared with historically collected gait and motion data of a patient to detect early-warning symptoms of strokes or other neurological disorders. When the disclosed device detects any of these types of symptoms based on the monitored patient's collected data, a warning message may be displayed on any of the user interfaces to alert a caregiver of any detected symptoms.

As described above any of these rehabilitation operations may be either caregiver operated, patient operated, or combination of caregiver and patient operated via the respective user interfaces. Additionally, any of these rehabilitation operations who may use video, load sensors and speed sensors to analyze the patience progress during a rehabilitation therapy session to provide feedback and/or control motion of the patient lifting and rehabilitation device.

If the patient lifting and rehabilitation device malfunctions during operation, for example, with a battery malfunction, the device may be configured to manually lower and manually detach a patient by releasing the patient from the patient lifting mechanism on the traveler on the transverse member. Additionally, the device may be configured to be manually moved by an operator without battery power. For example, the device may be manually pushed without operating under its battery power.

The following features are made possible by the devices and techniques disclosed herein, and may be included in a patient transport and rehabilitation device as disclosed herein. Specific devices may include one or more of these features in any combination and in any combination with any features previously disclosed herein, without departing from the scope and content of the present disclosure or the associated claims.

Transform Protection: the user cannot, by normal operation, cause a self-damaging behavior with the patient transportation and rehabilitation device (e.g. columns can go higher than an 'allowed' height or distance).

Ease-of-Use: the patient transportation and rehabilitation device may be very easy to maneuver and thus never obstruct other daily patient handling. The patient transportation and rehabilitation device may be very easy to maneuver with patients between stations like bed, wheelchair, toilet, etc.

Confined Space Movability: The patient transportation and rehabilitation device can be controlled accurately in confined space to prevent hazards to patient or environment.

Quick Start: The patient transportation and rehabilitation device may be ready to use right from the delivery. The patient transportation and rehabilitation device can be adapted for local procedures, on-screen instructions, etc.

Access Control: The patient transportation and rehabilitation device features ensures that only trained and registered personnel can operate the patient transportation and rehabilitation device.

Smooth Motion: The patient transportation and rehabilitation device ensures smooth and gentle motions in patient transportation and rehabilitation device handling to ensure patient comfort. Automatically stops driving when it touches an object to prevent risk of damaging the object or the patient transportation and rehabilitation device itself.

Human Bumper Safety: The patient transportation and rehabilitation device automatically stops driving when it hits a human foot to prevent personal injuries.

Transform: The patient transportation and rehabilitation device can safely change height and width even while carrying patient to ensure smooth and efficient transport.

Simultaneous Transform: The patient transportation and rehabilitation device may be capable of simultaneous control of height and width to increase operational smoothness and efficiency.

Push Aside: The patient transportation and rehabilitation device can in case of an emergency always be moved to prevent personal or environmental harm or disrupt.

Manual Patient Disengagement: The patient transportation and rehabilitation device has integrated features ensures patients can always be lowered and released in a break-down situation or similar.

Gentle Patient Lifting: The patient transportation and rehabilitation device can sense loads higher that 15 kg when lifting patients, and automatically activate the slower lifting mode.

Overweight Protection: The patient transportation and rehabilitation device warn and stop operation when overloaded to avoid risk of damaging the patient transportation and rehabilitation device and harming the patient.

One-Hand Drive: The patient transportation and rehabilitation device may be intuitively driven with a one hand device ensuring the caregiver can have full patient focus.

One-Hand Sling Control: The patient transportation and rehabilitation device sling lifting and translation may be controlled by intuitive one hand device ensuring the caregivers patient focus.

One-Hand Transform Control: The patient transportation and rehabilitation device height and width adjustment may be controlled by intuitively one hand device ensuring the caregivers patient focus.

On-Screen Operational Status: The patient transportation and rehabilitation device status may be shown on interaction screen to give the caregiver relevant information for operation.

On-Screen Guidelines: The patient transportation and rehabilitation device has on-screen necessary and helpful guiding and instructional material on the patient transportation and rehabilitation device. Local patient handling procedures can be added.

Sideways Patient Displacement: The patient transportation and rehabilitation device can displace a patient within the frame of the patient transportation and rehabilitation device.

Patient Fall Accident Recovery: The patient transportation and rehabilitation device has specific features to help caregiver recover patients from floor after fall accidents.

Patient Bed-to-Chair: The patient transportation and rehabilitation device features to ensure smooth and efficient patient transfer from a bed into a chair or wheelchair.

Patient Transfer in General: The patient transportation and rehabilitation device features to ensure smooth and efficient patient transfer from bed to new placement.

Patient Slide Protection: The patient transportation and rehabilitation device features ensures that patients are always lifted vertically to prevent patient skin damage from sliding on the sheet.

Patient Non-Swing: The patient transportation and rehabilitation device movements are designed to prevent the patient from uncomfortable swinging.

Easy-Charging: The patient transportation and rehabilitation device utilizes a small and compact charger that makes it easy to charge the patient transportation and rehabilitation device on location.

Hygienic Design: The patient transportation and rehabilitation device may be designed for simple and easy cleaning to comply with hospital standards, (IP65).

Connected to Networks: The patient transportation and rehabilitation device may be always connected to a cloud network to enhance the use and maintenance as well for special feature subscriptions.

Ergonomic Push Buttons: ergonomic push buttons to increase user satisfaction.

Find My Device: Bluetooth application or use of tags/RFID, compatible with the hospital system which help to locate devices in the hospital.

Anti-Static Wheels: Wheels are anti-static.

Human 3D Safety: Uses RGB cameras as a redundant safety system with 3D sensor and bumper to avoid human collisions.

Obstacle 3D Safety: Using RGB cameras as a redundant safety system with 3D sensor and bumper on wheelbase to avoid obstacle collisions.

Tower 3D Safety: Protection of tower and transverse member collisions with doors, door frames and similar static overhead structures.

Safe Autonomy Operation: The user cannot command the device to cause injury to the user or patient damage under normal operation.

Guided Door Passage: The patient transportation and rehabilitation device provides accurate movement control through standard hospital doors with and without patients.

Gait transfer: The patient transportation and rehabilitation device allows patients with enough leg strength to be active when transferred to start early and simple rehabilitation.

Patient controlled gait training: Mental and physical healthy patients can use the patient transportation and rehabilitation device for self-controlled gait training supporting the patient's rehabilitation.

Patient weight info: System measures and provides a weight of a patient.

Patient Slide Protection: A patient transportation and rehabilitation device autonomous features that ensures patients are always lifted vertically thus preventing patient skin damage from a bed sheet sliding over the patient.

Swing Elimination: The patient transportation and rehabilitation device movements are designed to prevent the patient from uncomfortable swinging with motion provided by the device to actively counter-act and dampen any swinging induced by a patient or induced during a patient lifting process.

Positioning Assist System: To be able to see all blind angles when positioning the patient transportation and rehabilitation device around a bed.

Driving Assist System: To avoid the patient transportation and rehabilitation device from bumping into doors or equipment hanging in the ceiling, by utilizing additional proximity sensors and/or an RGB reverse camera.

Extended Spreader bar: A wider and broader spreader bar may be provided to be able to optimize the transferring patients of certain size or in certain locations needing an extended range of motion.

Connection to spreader bar: Be able to easily disconnect and connect another spreader bar.

Wireless Hand Control: Wireless controller to replace corded controller.

Wireless Hand Control Alarm: Alarm in wireless hand control to notify when the hand control may be too far away from the patient transportation and rehabilitation device, thereby preventing separation of the hand control from the patient transportation and rehabilitation device.

Access Control: The patient transportation and rehabilitation device may be unlocked by hospital staff access card.

Joystick Protection: Prevents the joystick from being moved unintentionally during patient transportation or rehabilitation operations.

Fast Transport: Higher transport speed with no patient in the patient transportation and rehabilitation device during transport of the device. Provides a fixed wheelbase in order to easier move forward. Higher transport speed only through menu and default back to "normal (slower) speed".

Fast Patient Transport: Higher transport speed with a patient in the patient transportation and rehabilitation device may be possible when transporting a patient over a longer distance. Also provides a fixed wheelbase during transport. Higher transport speed only through menu and default back to "normal (slower) speed".

Adjustable Joystick position: Able to adjust the height of the joystick to assure good ergonomics for various personal heights.

Wireless Charger: Charging by means of a charging platform in the floor or a docking station.

Hanging IV Fluids: Patients with IV fluids must have their liquids/medicine with them during the transportation and rehabilitation process where the patent transportation and rehabilitation device may have hangers located on it configured to hold patient IV fluids without obstructing the patient's transportation and rehabilitation.

User Manual: Any important instruction must be a part of the labeling on the patient transportation and rehabilitation device. Instructions via short videos accessible from the user interface menu(s). Instructions may include working procedures and transfer operations.

Hygiene/Disinfection process: After patient transfer, the patient transportation and rehabilitation device may issue an indication on the user interface to request staff to perform cleaning/disinfection of the device according to a specified guideline.

Doors Auto-Resize: Auto-resize at a detected door.

Enhanced Drive/Control Drive: The patient transportation and rehabilitation device assists the caregiver to avoid obstacles when driving the patient transportation and rehabilitation device in rooms to prevent collisions.

Auto-placement: Ensures automatic placement of patient transportation and rehabilitation device above the patient before a patient lifting process.

Swing warning: The patient transportation and rehabilitation device movements are designed to prevent the patient from uncomfortable and dangerous swinging. If a swing situation arises, a warning may be given.

Swing Emergency Stop: Block patient transportation and rehabilitation device operations when detecting a dangerous pendulum swinging event.

Auto-Move: Automatically moves to given positions in a pre-mapped environment.

Return-To-Charging Base: Automatic self-driving of the patient transportation and rehabilitation device back to the charger and self-docking.

Built-in Charger: 120V/230V AC built-in charger.

Quick Battery Charging: Fast charging of the patient transportation and rehabilitation device to ensure higher operation time utilizes a 24V DC fast charger.

Tele-Health Monitoring: where an operator needs to be notified if any part of the patient transportation and rehabilitation device may be malfunctioning.

Patient Pivot: Patient transportation and rehabilitation device can turn around the patient, while the patient stays in the same place.

Preventive Maintenance: Predictive maintenance and statistics are provided to user to reduce down-time.

Find My Device Independent of a Hospital System: a caregiver can see a visual indication of where the patient transportation and rehabilitation device may be located in the hospital, using a smart telecommunication device or device in room.

Call-In My Device: Call-in patient transportation and rehabilitation device by a smart telecommunication device application where a caregiver sends a message from a user-interface screen and requests the patient transportation and rehabilitation device to move to particular requested location.

Availability and Occupation Check: A caregiver may check if the patient transportation and rehabilitation device may be in use or free, if in use, where it may be being used, who may be using it, and an estimate of when patient transportation and rehabilitation device may be free for use.

Booking: A caregiver can create a new job for the patient transportation and rehabilitation device and books the patient transportation and rehabilitation device. Some jobs may have higher priority, for example, when a patient falls and needs to be lifted by the device.

Teleoperation: Remotely controlled using an application on a communication device at the device location.

Follow Me: The device may be programmed to follow another human or follow another patient transportation and rehabilitation device.

In Room Placement: positions the device around a bed or chair for a patient lift operation without collision under a shared control with an operator or fully automated control without operator intervention.

Comfortable Transport: Patient comfort may be detected by at least one of a tactile sensor, a voice command from a patient, and/or motion capture technology, where the device may adjust its speed for position and comfort of the patient.

Personalization: manual and facial identity recognition, to identity a Patient and a caregiver and store profile and performance data.

Rehabilitation Journal and Data Integration: Build a rehabilitation journal of the patient exercises and recovery status, and transfer data automatically to the patient profile in hospital/rehabilitation center.

Rehabilitation Planner: Based on patient history, create personalized rehabilitation plans by healthcare professional, e.g., a physiotherapist at the patient location or remotely, where the caregiver will execute or oversee the rehabilitation process and provide a report via the user interface of the device.

Automated Rehabilitation Planner: To simulate and generate personalized rehabilitation program, (as prescribed by, e.g., a physiotherapist), based on a patient profile and a progress report.

Rehabilitation Program Editor: A physiotherapist/caregiver may create a new rehabilitation or exercise program by selecting predefined tasks, (e.g., Program #1—Sit-to-Stand: X-number of squats, and walk with Y speed, for a Z distance).

Sit-to-Stand Rehabilitation Exercise: Sit-to-Stand rehabilitation exercise/therapy, provided under caregiver supervision.

Patient controlled Sit-to-Stand: Mental and physical healthy patients may use the patient transportation and rehabilitation device for self-controlled Sit-to-Stand training, supporting rehabilitation motivation and more movement freedom for the patient.

Balance Training—Rehabilitation Exercise: Balance training for the patient, under caregiver supervision.

Lift and Transfer Monitoring: Report on the patient transportation and rehabilitation device lifting and transfer performance over time. E.g., Lifting data reported: 1. lift a patient from the bed and put them into a chair; and 2: From sit to stand. E.g., Transfer data reported: overall time, speed and distance.

Lift and Transfer Quality Monitoring: Detailed report on Lifting/Transfer Quality and patient performance over time. Quality data: stability of the sling during lifting and transfer, stability of the patient transportation and rehabilitation device, and number of adjustments made.

Patient Lift Progress Monitoring: Monitor patient status and progress in lifting, (sit-to-stand), live feedback, and report, generate re-adjustment suggestions.

Patient Transfer Progress Monitoring: Monitor patient status and progress in transferring (gate training and walking), live feedback, report and generate re-adjustment suggestions.

Visual tracking of motions: Visual tracking of motion of limbs and joints, by collecting, analyzing, recording and comparing historical data of visually tracked physical elements.

Rehabilitation tracker: Evaluates and reports rehabilitation progress during a period of time based on data of visually tracked physical elements.

Adjustable Rehabilitation: Patient transportation and rehabilitation device continuously adjusts to the strength of a patient's legs: 1. manually re-adjustment given by caregiver; 2. device informs caretaker when re-adjustment may be needed, and 3. Device automatically provides re-adjustment.

Rehabilitation forecast: Forecast for recovery likelihood of success, and recovery time.

Advanced health assessment: In addition to rehabilitation, to perform other health related assessments and reports.

User Satisfaction: Patient transportation and rehabilitation device receives input from caregiver regarding their satisfaction with the workflow of the patient transportation and rehabilitation device and provide feedback for further improvements.

Human Error Handling: Patient transportation and rehabilitation device detects and reports the failures and errors, where data may be analyzed, and corrections or upgrades are suggested.

Slow Lift: The patient transportation and rehabilitation device can be put into a "slow" mode to lift and lower the patient in a more controlled and comfortable operation for the patient.

Auto Slow Lift: The patient transportation and rehabilitation device has an automatic "slow" mode enabler when lifting and lowering a patient in a more controlled and comfortable manner.

The patient lifting and rehabilitation device may be configured to lift humans, and/or patients.

The patient lifting and rehabilitation device may be configured to change its size in one or more of the several axes: in a vertical height dimension, in a horizontal width dimension in either a side-independent movement or a dual side-coordinated movement.

The patient lifting and rehabilitation device may be configured to translate the patient in a horizontal direction between each side of the vertical towers.

The patient lifting and rehabilitation device may be configured to have omni-directional wheels.

The patient lifting and rehabilitation device may be configured to have multiple human machine interfaces, each in a different location, where each interface may be configured to controlling the entire operations of the patient lifting and rehabilitation device.

The human machine interface may be a joystick with movement control in some or all directions (left, right, up and down), and with a rotation button or twistable knob on it to control the rotation of the machine around its vertical axis.

A portion of the user-interface controls may be a touch screen to both receive user control input for different operations of the patient lifting and rehabilitation device and to graphically display user prompts, device status and feedback of control operations and observed or calculated patient data.

The patient lifting and rehabilitation device may be equipped with one or more sensors that can detect distance and/or proximity. The one or more sensors may be a time-of-flight camera, a radar sensor, a LiDAR sensor, time-of-flight sensor, an ultrasonic sensor, and/or an RGB camera.

The one or more sensors may assist a user when operating the patient lifting and rehabilitation device to avoid obstacles, by warning the user and/or stopping the patient lifting and rehabilitation device before it contacts an obstacle.

If an obstacle may be sensed by the one or more sensors as potentially colliding with an outward edge of the patient lifting and rehabilitation device, the patient lifting and rehabilitation device may adjust its dimensions the vertical and/or horizontal direction, while still moving in the direction under control of the caregiver/operator, to avoid the obstacle.

The patient lifting and rehabilitation device may detect objects by RGB camera. The caregiver/operator may command the patient lifting and rehabilitation device automatically position itself in front of or above an object detected by the RGB camera, for example, a chair, or a hospital bed. The patient lifting and rehabilitation device may then autonomously position itself above or around the object to enable the caregiver/operator to initiate a patient lifting procedure.

For safety reasons, this autonomous movement of the patient lifting and rehabilitation device may be undertaken only when the caregiver may be in continual contact with a user interface of the patient lifting and rehabilitation device, for example, by holding a user-interface button, or by approving the autonomous movement by other physical means, such that an interruption of the contact with the user interface may stop any autonomous function of the patient lifting and rehabilitation device, that may be by providing a default-off connection state.

Example autonomous functions on the patient lifting and rehabilitation device may be configured to include:

Automatic positioning or repositioning, (e.g., if the patient moves), during a medical procedure or operation;

Autonomous transportation to, e.g., a bed side, a room, or a specific location to which the patient lifting and rehabilitation device may be requested in either a non-emergency or an emergency situation;

Autonomously programmed training sessions for caregivers/operators; and/or

Patient rehabilitation training sessions, e.g., to improve patient balance when sitting in a chair, patient gait training, patient sit-to-stand training without therapist involvement or with remote-access for guidance.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A lift device comprising:
   two vertical extendible tower members, each of the two vertical extendible tower members including
      at a first lower distal end,
      an omnidirectional wheel assembly, and
      a vertical extension assembly configured to simultaneously raise and lower the two vertical extendible tower members in a vertical direction; and
   a horizontal extendible transverse member connected between second opposing distal upper ends of the two vertical extendible tower members, the horizontal extendible transverse member including
      a horizontal extension assembly configured to extend and retract the horizontal extendible transverse member in a horizontal direction perpendicular to the vertical direction,
      a traveler carriage configured to move in the horizontal direction upon the horizontal extension assembly between the second opposing distal upper ends of the two vertical extendible tower members,
      a payload lifting device configured to raise and lower a payload in the vertical direction with respect to the traveler carriage on the horizontal extension assembly;
      a left horizontal end structure configured to be attached to one end of the vertical extension assembly of the two vertical extendible tower members;
      an opposite right horizontal end structure configured to be attached to another end of the vertical extension assembly of the two vertical extendible tower members; and
      a telescopic slide assembly configured to connect the left and right horizontal end structures to the traveler carriage, the telescopic slide assembly further including
         a first pair of telescopic slides attached to the left horizontal end structure and the traveler carriage, the first pair of telescopic slides defining a first plane being substantially diagonal to the horizontal direction; and
         a second pair of telescopic slides attached to the opposite right horizontal end structure and the traveler carriage, the second pair of telescopic slides defining a second plane being substantially diagonal to the horizontal direction and substantially orthogonal to the first plane defined by the first pair of telescopic slides.

2. The lift device of claim 1, wherein the telescopic slide assembly further comprises:
   a first pair of telescopic slides attached from the left horizontal end structure to an upper portion of a first side and to a lower portion of an opposite second side of the traveler carriage; and
   a second pair of telescopic slides attached from the opposite right horizontal end structure to an upper portion of the opposite second side and to a lower portion of the first side the traveler carriage.

3. The lift device of claim 1, wherein the telescopic slide assembly is configured to be attached to an exterior portion of the left and right horizontal end structures and to an interior portion of the traveler carriage,
   wherein the telescopic slide assembly is configured to allow the traveler carriage to translate in a range motion between the two vertical extendible tower members.

4. The lift device of claim 1, further comprising:
   a machine vision system configured to assist in controlling the lift device from at least one image capture device,
   wherein the machine vision system is configured to
      assist in navigation control of the lift device when the omnidirectional wheel assemblies are operating, and
      assist in extending at least one of the two vertical extendible tower members or the horizontal extendible transverse member with respect to one of
         the payload being lifted by the payload lifting device or a sensed potential obstruction in a motion path of the lift device.

5. The lift device of claim 1, further comprising:
   at least one user interface configured to control navigation and extension of the extendible members of the lift device, and lifting the payload via the payload lifting device.

6. A lift device system comprising:
   a lift device including
      two vertical extendible tower members supporting a horizontal extendible transverse member further including
         a horizontal extension assembly configured to extend and retract the horizontal extendible transverse member in a horizontal direction perpendicular to a vertical direction, a traveler carriage configured to move in the horizontal direction upon the horizontal extension assembly between the two vertical extendible tower members, the horizontal extension assembly further including a first pair of telescopic slides attached to a left horizontal end structure and the traveler carriage, the first pair of telescopic slides defining a first plane being substantially diagonal to a longitudinal axis of the traveler carriage; and a second pair of telescopic slides attached to a right horizontal end structure, the second pair of telescopic slides defining a second plane being substantially diagonal to the longitudinal axis of the traveler carriage and substantially orthogonal to the first plane, and an omnidirectional wheel assembly configured to translate and rotate the lift device, and a payload lifting device configured to raise and lower a payload with respect to the horizontal extendible transverse member and translate the payload in a horizontal direction between the two vertical extendible tower members;

a navigation control system configured to provide navigation control to the lift device when the omnidirectional wheel assembly is operating;

an extension control system configured to provide extension control to the two vertical extendible tower members and the horizontal extendible transverse member; and a user-interface system configured to receive input from and provide feedback to an operator.

7. The lift device system of claim 6, wherein the navigation control system further comprises a machine vision system configured to assist in controlling the lift device by providing navigation feedback to the navigation control system when the omnidirectional wheel assembly is operating, and providing extension feedback to the extension control system when extending at least one of the two vertical extendible tower members or the horizontal extendible transverse member with respect to one of the payload being one of lifted or translated by the payload lifting device, or a sensed potential obstruction in a motion path of the lift device.

8. The lift device system of claim 6, wherein the navigation control system further comprises a proximity detection system configured to assist in controlling the lift device by, providing navigation feedback to the navigation control system when the omnidirectional wheel assembly is operating, and providing extension feedback to the extension control system during a process of extending at least one of the two vertical extendible tower members or the horizontal extendible transverse member with respect to one of the payload being lifted by the payload lifting device, or a sensed potential obstruction in a motion path of the lift device.

9. The lift device system of claim 6, wherein the user-interface system has at least one user-interface device configured allow an operator to control the lift device system, wherein the at least one user-interface device is at least one of one of a wireless connection or a tethered wired connection to control the lift device system, and disposed in one of a removable or a permanent attachment configuration to at least one of the two vertical extendible tower members.

10. The lift device system of claim 9, wherein the at least one user-interface device further comprises:

a rotatable X-Y joystick input device configured to control translation and rotational motion of the lift device via the navigation control system;

an extension control input device configured to control extension and retraction of the two vertical extendible tower members and the horizontal extendible transverse member via the extension control system; and a display output device configured to display extension dimensions of the two vertical extendible tower members and the horizontal extendible transverse member, and speed and direction values of the lift device when the omnidirectional wheel assembly is operating.

11. The lift device system of claim 6, wherein the horizontal extension assembly further comprises:

a first pair of telescopic slides attached from the left horizontal end structure to an upper portion of a first side and to a lower portion of an opposite second side of the traveler carriage; and a second pair of telescopic slides attached from the right horizontal end structure to an upper portion of the opposite second side and to a lower portion of the first side the traveler carriage.

12. A method of operating a lift device, the method comprises:

providing a lift device including two vertical extendible tower members supporting a horizontal extendible transverse member, an omnidirectional wheel assembly configured to translate and rotate the lift device, a payload lifting device configured to raise and lower a payload with respect to the horizontal extendible transverse member and translate the payload in a horizontal direction between the two vertical extendible tower members; and extending the horizontal extendible transverse member along two pairs of telescopic slides, wherein a first pair of telescopic slides are attached to a left horizontal end structure of the horizontal extendible transverse member and a traveler carriage, the first pair of telescopic slides defining a first plane being substantially diagonal to the horizontal direction, the first pair of telescopic slides attached from the left horizontal end structure to an upper portion of a first side and to a lower portion of an opposite second side of the traveler carriage, and a second pair of telescopic slides are attached to a right horizontal end structure of the horizontal extendible transverse member and the traveler carriage, the second pair of telescopic slides defining a second plane being substantially diagonal to the horizontal direction and substantially orthogonal to the first plane defined by the first pair of telescopic slides, the second pair of telescopic slides attached from the right horizontal end structure to an upper portion of the opposite second side and to a lower portion of the first side the traveler carriage; and translating the payload lifting device on the traveler carriage within a range motion between the two vertical extendible tower members.

13. The method of operating according to claim 12, the method further comprises:

providing a machine vision system configured to assist in controlling the lift device;

providing, by the machine vision system, navigation feedback to a navigation control system when the omnidirectional wheel assembly are operating; and providing, by the machine vision system, extension feedback to an extension control system when extending at least one of the two vertical extendible tower members or the horizontal extendible transverse member with respect to one of the payload being one of lifted or translated by the payload lifting device, or a sensed potential obstruction in a motion path of the lift device.

14. The method of operating according to claim 12, the method further comprises:

providing a proximity detection system configured to assist in controlling the lift device;

providing, by the proximity detection system, navigation feedback to a navigation control system when the omnidirectional wheel assembly are operating; and providing, by the proximity detection system, extension feedback to an extension control system during a process of extending at least one of the two vertical extendible tower members or the horizontal extendible transverse member with respect to one of the payload being lifted by the payload lifting device or a sensed potential obstruction in a motion path of the lift device.

15. The method of operating according to claim 12, the method further comprises:

providing at least one user-interface device configured to be at least one of wirelessly or directly connected to the lift device and further configured to allow an operator to control the lift device;

receiving, on the at least one user-interface device, direction and rotation input from an operator configured to control translation and rotational motion of the lift device;

receiving, on at least one user-interface device, extension control input from the operator configured to control extension and retraction of the two vertical extendible tower members and the horizontal extendible transverse member; and displaying, on the at least one user-interface device, extension dimensions of the two vertical extendible tower members and extension dimensions of the horizontal extendible transverse member, and a speed value of the lift device.

16. A lift device comprising:

a horizontal extendible transverse member including a first horizontal end structure at a first distal end of the horizontal extendible transverse member, and an opposite second horizontal end structure at a second opposite distal end of the horizontal extendible transverse member, each horizontal end structure configured to be connected to a vertical support structure;

a traveler carriage configured to move in a horizontal direction upon the horizontal extendible transverse member and lift a payload in a vertical direction; and a telescopic slide assembly configured to connect the first and the opposite second horizontal end structures by a first pair of telescopic slides attached to the first horizontal end structure and the traveler carriage, the first pair of telescopic slides defining a first plane being substantially diagonal to the horizontal direction; and a second pair of telescopic slides attached to the opposite second horizontal end structure and the traveler carriage, the second pair of telescopic slides defining a second plane being substantially diagonal to the horizontal direction and substantially orthogonal to the first plane defined by the first pair of telescopic slides.

* * * * *

UNITED STATES PATENT AND TRADEMARK OFFICE
CERTIFICATE OF CORRECTION

PATENT NO. : 11,951,056 B2
APPLICATION NO. : 17/163773
DATED : April 9, 2024
INVENTOR(S) : John E. Ostergaard, Efraim Vitzrabin and Rogerio Toniato Lugon Valladao It is certified that error appears in the above-identified patent and that said Letters Patent is hereby corrected as shown below:

On the Title Page

Item (12), "John E. Oestergaard" should be corrected to "John E. Ostergaard."

Item (72), "John E. Oestergaard" should be corrected to "John E. Ostergaard."

Signed and Sealed this
Twentieth Day of August, 2024

*Katherine Kelly Vidal*

Katherine Kelly Vidal
*Director of the United States Patent and Trademark Office*